Sept. 19, 1967 W. B. ZERN 3,342,227
SYSTEM FOR CUTTING TRIM MEMBERS AND DOOR STOPS
AND ASSEMBLING SAME
Filed Oct. 2, 1964 18 Sheets-Sheet 4

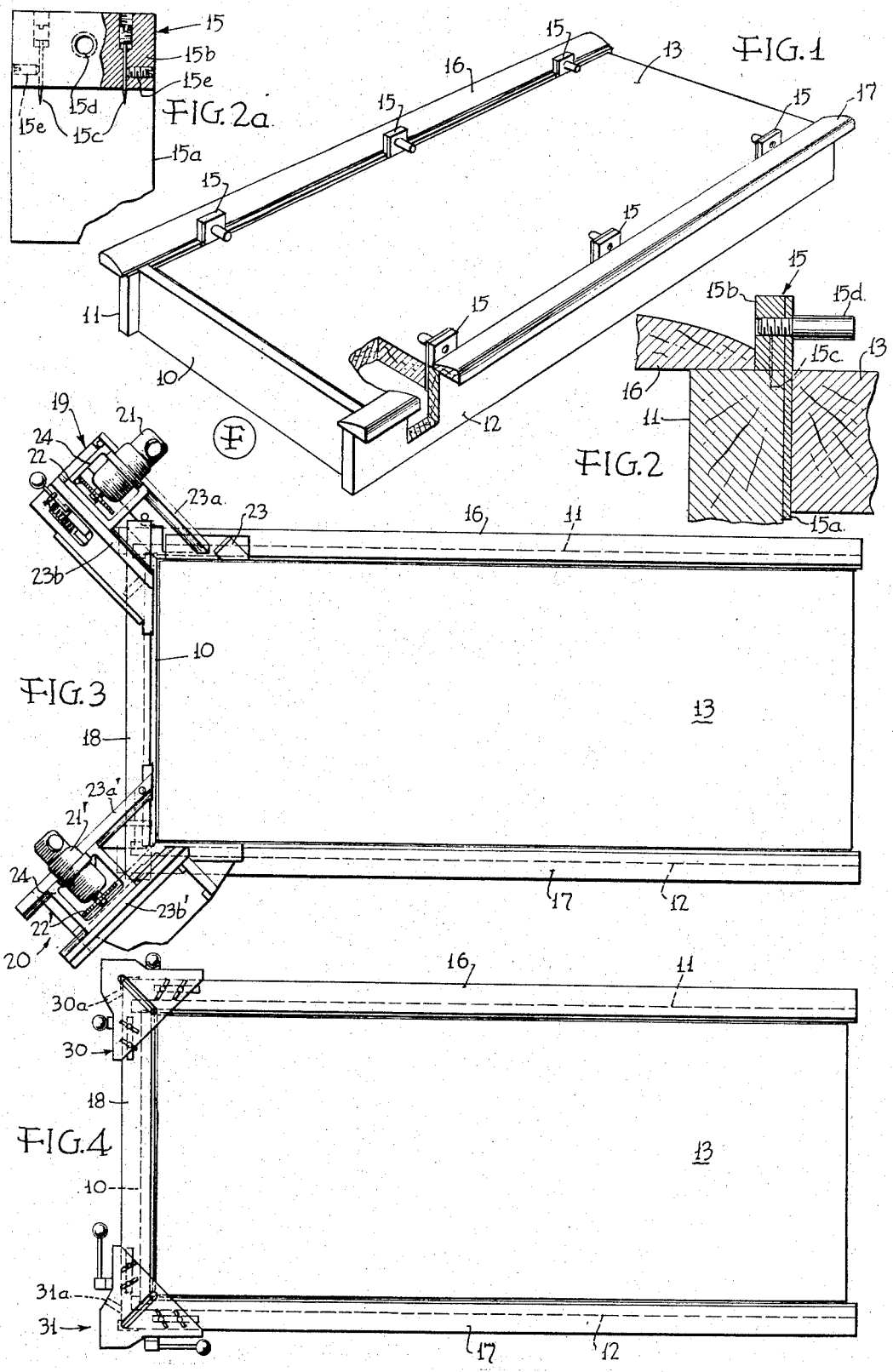

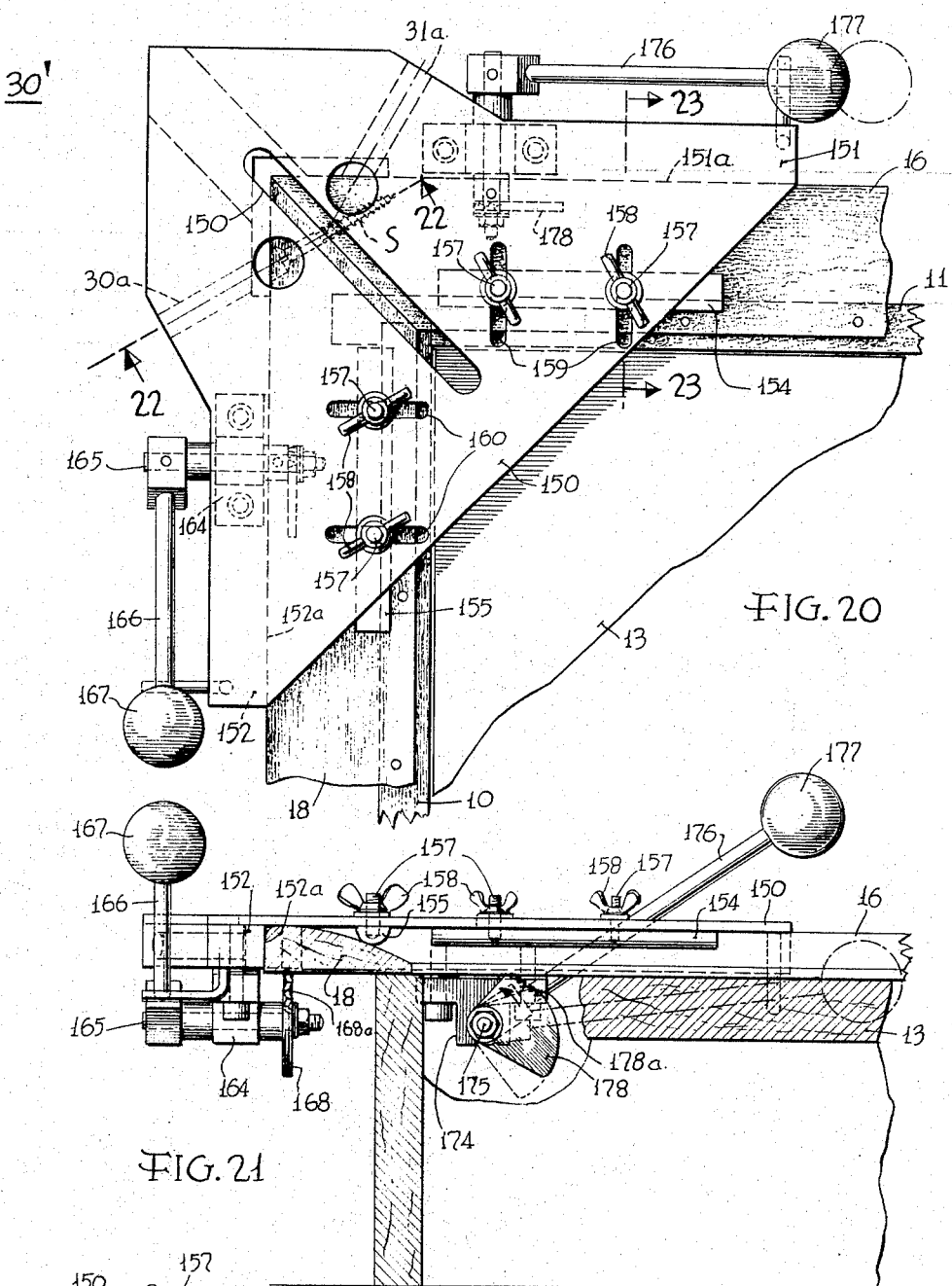
FIG. 20
FIG. 21
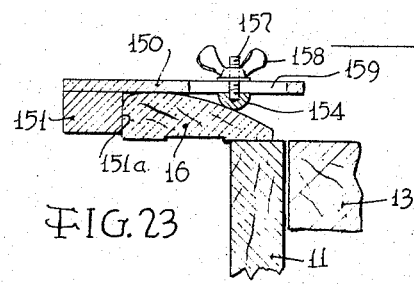
FIG. 23
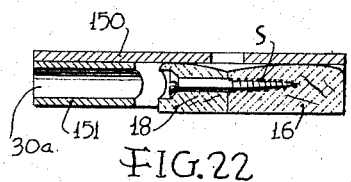
FIG. 22

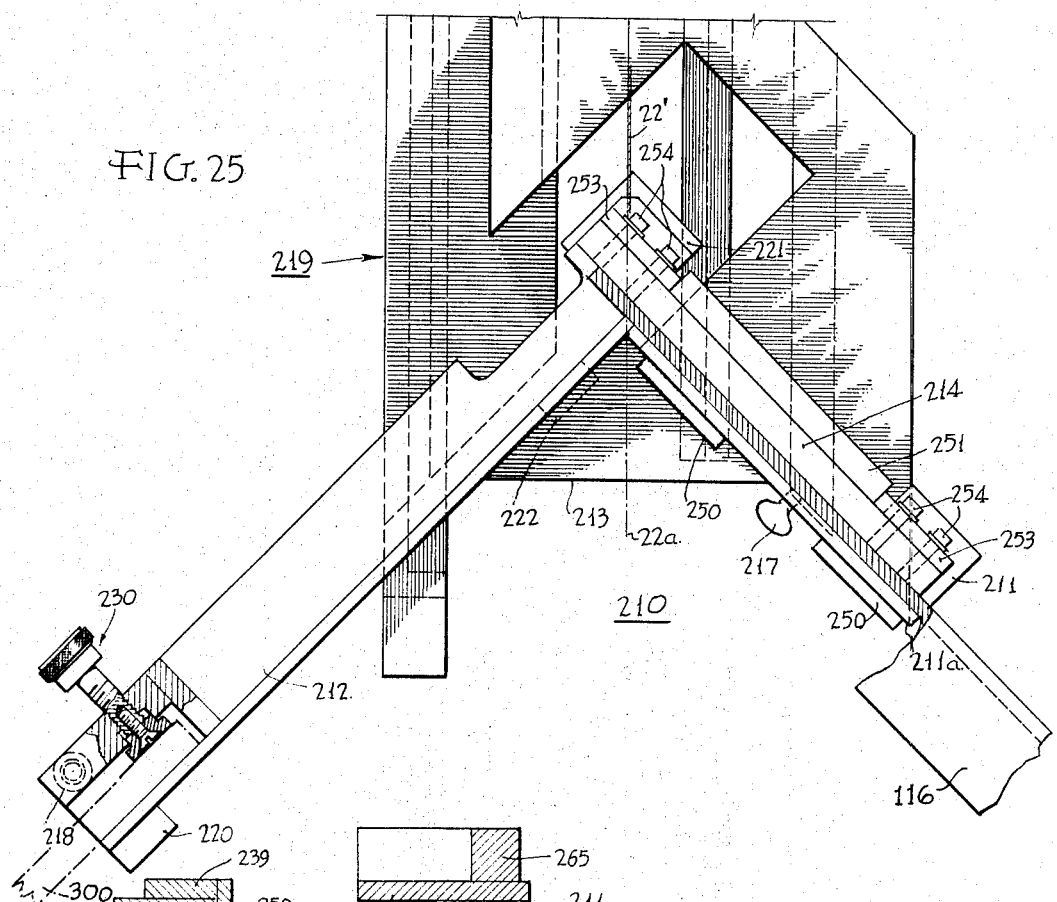

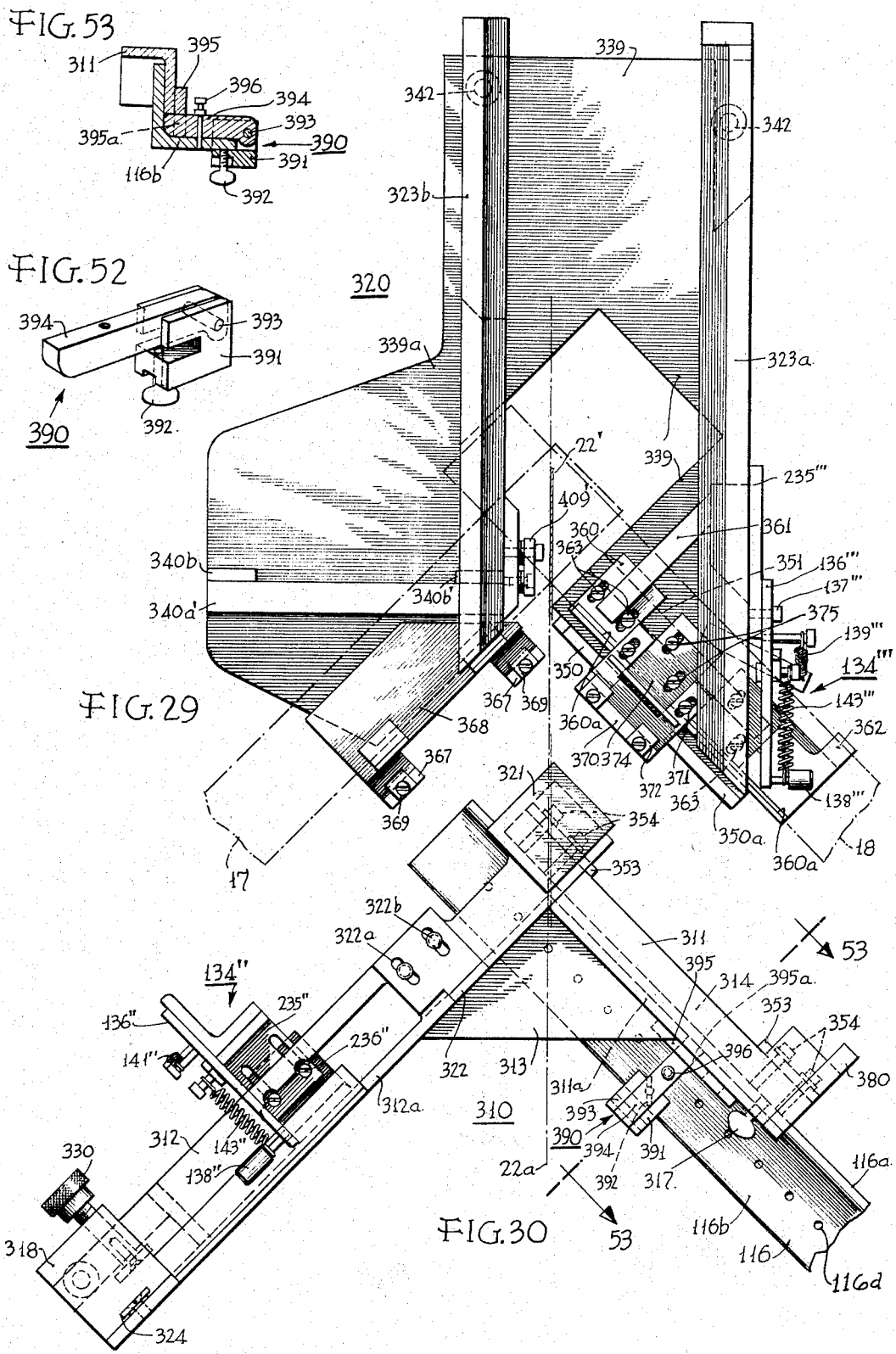

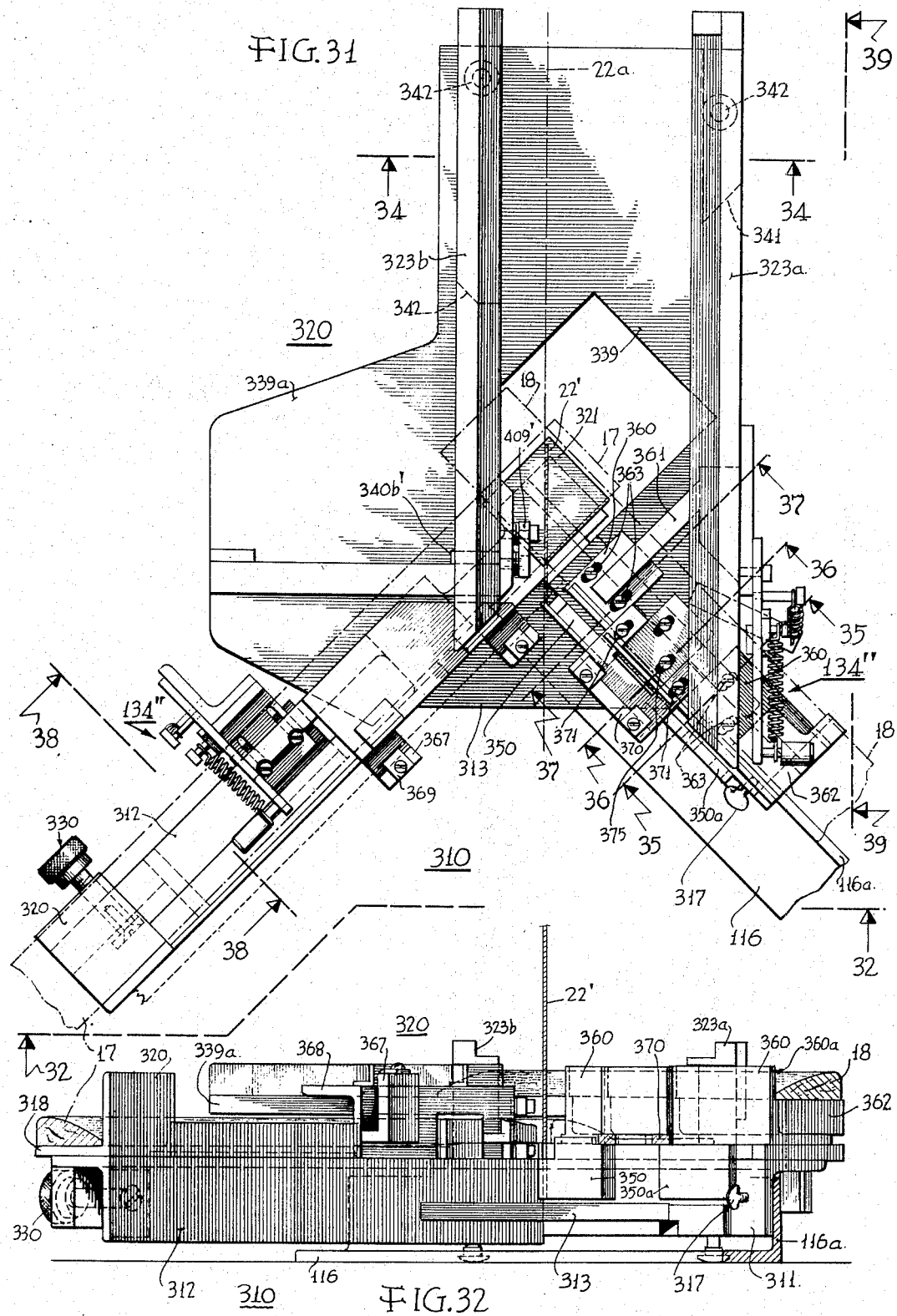

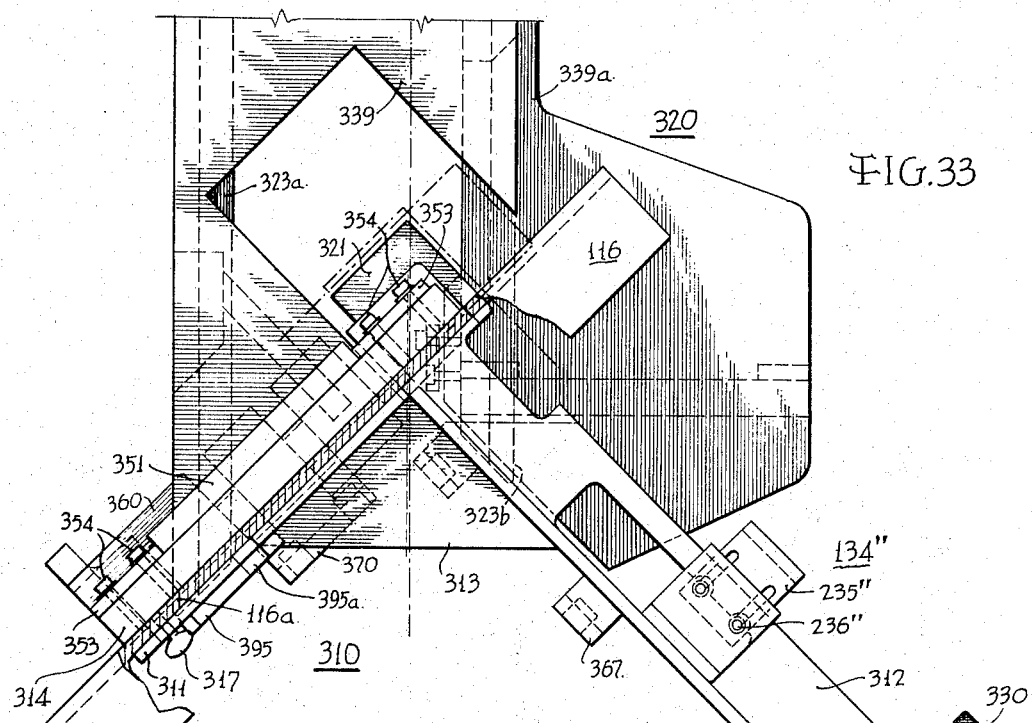
FIG. 33
FIG. 34
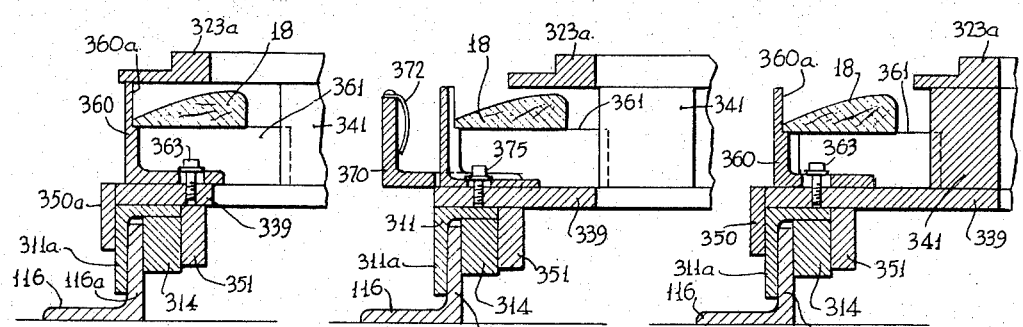
FIG. 35   FIG. 36   FIG. 37

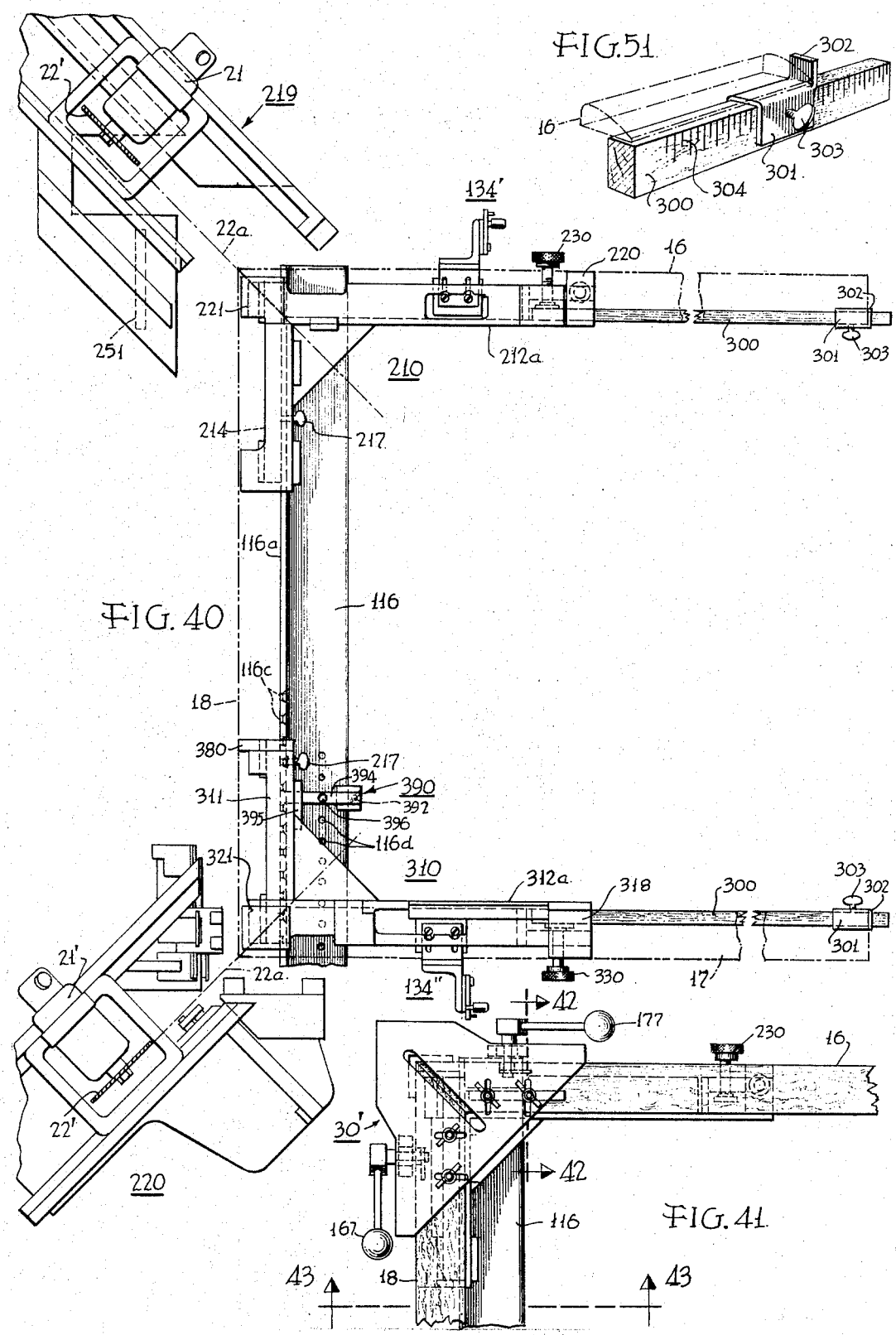

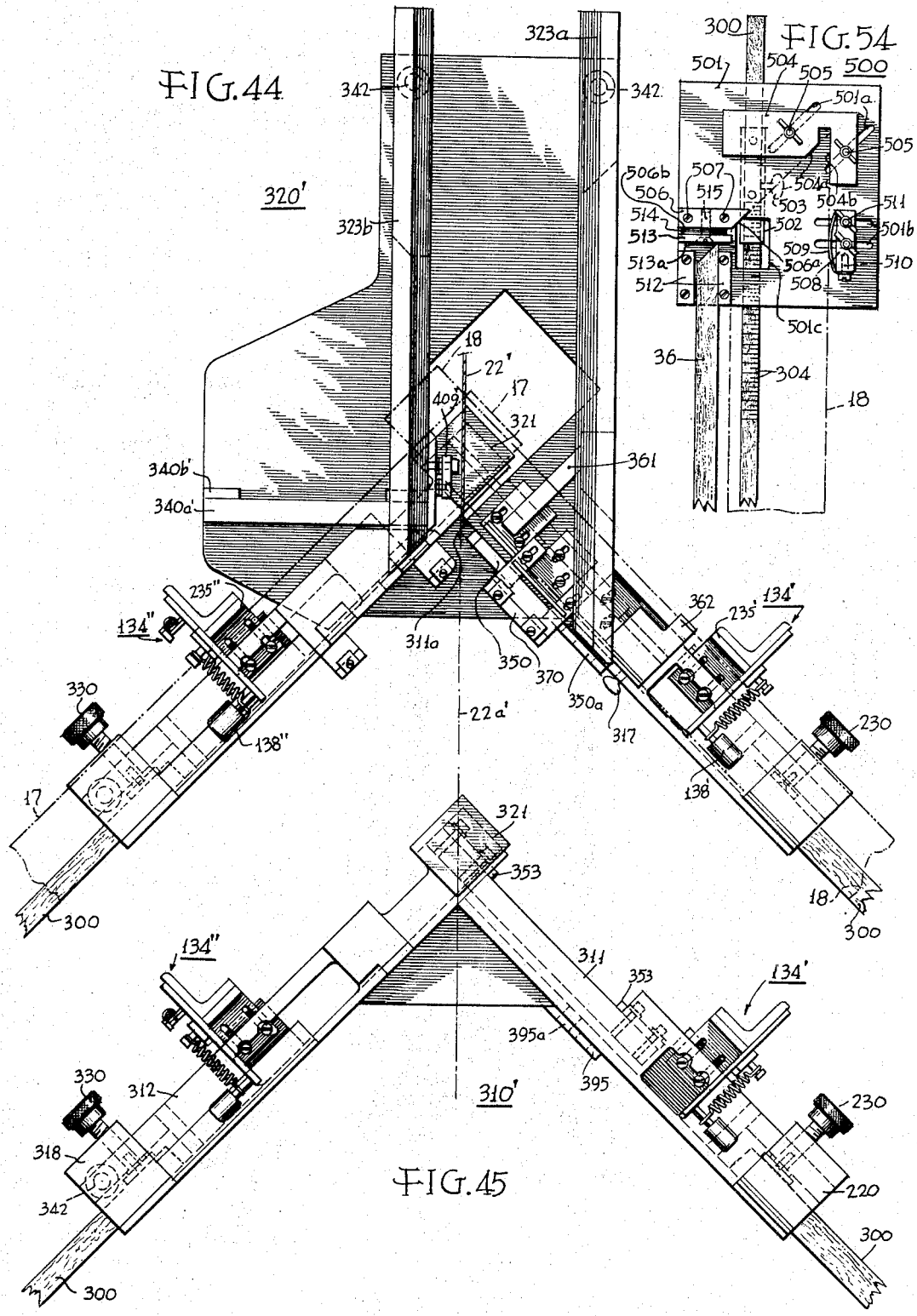

ized Sept. 19, 1967

3,342,227
SYSTEM FOR CUTTING TRIM MEMBERS AND
DOOR STOPS AND ASSEMBLING SAME
Warren B. Zern, 1016 N. Evans and Mineral Sts.,
Pottstown, Pa. 19464
Filed Oct. 2, 1964, Ser. No. 401,170
63 Claims. (Cl. 144—314)

This invention relates to a system for cutting and assembling trim members and door stops and has for an object the provision of improved methods and apparatus for cutting the miters on trim members for doors and windows and also on door stops and assembling same so that the miter joints formed by adjacent members will fit perfectly and provide a good appearance.

One of the most difficult miter joints to cut and assemble is the joint formed between one end of the head trim member and its adjacent side trim member. The trim members for doors and windows are relatively wide and thus the miter joint formed between adjacent trim members is relatively long. If the trim members do not fit together perfectly along the miter, this greatly detracts from the appearance of the installation. Various arrangements and systems have been provided heretofore for solving the foregoing problems. For example, in Zern Patent 2,940,485 there was disclosed woodworking apparatus for cutting a miter on trim and door stops where the work was adapted to be supported on a table over which extended two rotary blade power saws of the radial type. The free ends of the arms were locked together so that the tracks along which the saws moved formed an angle therebetween of precisely 90°. The saws were adapted to move separately and cut the miters on the side trim member and the side stops or they could be moved together concurrently to cut off the ends of a head stop member or head trim member. While this arrangement maintained the dimension along the inner edge of the trim, it did not always insure that the miter joints would fit perfectly as the trim members were not cut while in assembled relation. After the trim members were cut, they were then assembled, preferably with a system such as disclosed in Zern Patent 3,015,348. The system disclosed therein is sometimes referred to as a "trimming table" and is employed for assembling pre-cut trim members to door jambs. While the apparatus disclosed in the aforesaid patents represented a substantial advance in the art, nevertheless it left something to be desired inasmuch as it was not always possible to obtain a perfect miter joint with such equipment, particularly if there was any warping of the trim members. Additionally, the assembling operations could not be performed as rapidly as desired.

The foregoing problems have been overcome by the present invention wherein the trim members are supported during the cutting operation in the normal right angle relationship which they will have when assembled and during such cutting operation, the trim strips are tightly clamped in place to correct any warping which may be present in the trim members. Furthermore, the same cutting blade that cuts the miter on one end of the head trim member concurrently cuts the adjoining miter on the adjacent side trim member. While various attempts have been made heretofore concurrently to cut miters on adjacent trim members, no provision has been made to compensate for the thickness of the cutting blade. Such cutting blade has a substantial thickness, which if not taken into account during the cutting operation, will not insure a perfect miter joint.

In accordance with one aspect of the present invention, there is provided a method of and apparatus for cutting the trim members for doors, windows and the like wherein there is supported a pair of side trim members parallel to each other and in a common plane in the relative positions they will have in their normal installation. A head trim member is supported in a plane parallel to the plane of the side trim members with the head trim member extending across the upper ends of the side trim members and being perpendicular thereto so as to form right angles with the respective side trim members. The head trim member is positioned beyond its normal assembled head position with respect to the side trim members by a predetermined amount corresponding to the thickness of a cutting member. The miters on at least one end of the head trim member and the adjacent side trim member are cut concurrently while the trim members are held in their supported positions. After the miters have been cut on all the trim members, the head trim member is then moved into its normal assembled head position with respect to the side trim members. The adjacent mitered ends of the trim members are clamped in tight engagement and thereafter the clamped mitered ends are secured together to form a close fitting mitered joint. In clamping the mitered ends of the trim members together, the front faces of the trim members are moved against a support with the mitered ends of the trim members in approximately their normal assembled relation. A force is applied to the rear faces of the trim members, such force acting not only in a direction perpendicular to the support but also lengthwise of the respective trim members in the direction of the mitered ends. Thus, it will be seen that the trim members, even though they may be warped, are clamped into their proper position for insuring a perfect mitered joint before the adjacent mitered ends are secured together as by a screw inserted through the top edge of the head trim member.

The present invention is not only applicable to cutting and assembling trim members for doors and windows and the like, but it is also applicable to doors whether they be already installed in a building or whether they be in the form of a pre-cut assembly such as disclosed in Zern Patents 3,015,348 and 2,886,860 employing either "split jamb" or solid jamb construction. When the trim is being cut for a pre-cut door assembly, the jamb members comprising the door frame serve as a support for the trim members and the cutting tools or jigs for cutting the miters are clamped to the jamb members and to the trim members holding them in fixed predetermined relationship. When the trim members are being cut for door frames which have already been installed, then special supports are provided which correspond to the jamb members making up the door frame. These support members carry the trim members and the cutting tools or jigs are adapted to be clamped to the support members to hold the trim members in predetermined relationship to the normal positions of installation on a door. This arrangement is also suitable for cutting the trim members for windows where the frames have already been installed in the building. The present invention also provides a method of and apparatus for cutting trim members for windows in quantity. However, in each of the arrangements and systems disclosed herein, the side trim members and the head trim member are positioned in the normal right angle relationship which they will have when installed and the head trim member is positioned beyond its normal assembled head position with respect to the side trim members by a predetermined amount corresponding to the thickness of the cutting member. With this basic arrangement, the miters on the head trim member and the adjacent side trim members can be cut concurrently and thus there is assured a perfect mitered joint between the adjacent trim members.

It is a further object of the invention to provide a method of and apparatus for cutting the miters on door stops concurrently with the trim members so that the door stop members likewise will have a perfect mitered joint.

It is a further object of the invention to provide a corner clamping assembly which is capable of cutting the miters on trim members and stop members for both right-hand and left-hand corners.

It is a further object of the invention to provide a method of and apparatus for clamping and locking the mitered ends of trim members together to form a mitered joint.

It is another object of the invention to provide a method of an apparatus for gauging and cutting head jamb members to proper length.

It is a further object of the invention to provide a gauge for gauging the setback of trim members with respect to the corresponding jambs.

For a more detailed disclosure of the invention and for further objects and advantages thereof, reference is to be had to the following description taken in conjunction with the accompanying drawings in which:

FIG. 1 is a perspective view showing a door supported in a door frame and illustrating the manner of locating the side trim members so as to have the predetermined setback with respect to the face of the side jamb members;

FIG. 2 is a sectional view through one of the novel setback gauges in FIG. 1;

FIG. 2a is an elevational view partly in section of the setback gauge;

FIG. 3 is a top plan view of the door and frame of FIG. 1 with the trim members supported in position preparatory to the cutting of the miters with the novel jig assemblies;

FIG. 4 is a top plan view similar to FIG. 3 and showing the novel clamping assemblies employed to hold the mitered ends of the trim members in fixed relation while securing the trim members together to form the mitered joint;

FIG. 19 is a vertical sectional view taken along the plane 19—19 in FIG. 16;

FIG. 20 is a top plan view of the right-hand corner clamping assembly shown in FIG. 4;

FIG. 21 is a front elevational view of the right-hand clamping assembly shown in FIG. 20;

FIG. 22 is a sectional view taken along the lines 22—22 in FIG. 20;

FIG. 23 is a vertical sectional view taken along the plane 23—23 in FIG. 20;

FIG. 25 is a bottom plan view of the apparatus shown in FIG. 24;

FIG. 26 is a vertical sectional view taken along the plane 26—26 in FIG. 24;

FIG. 27 is a vertical sectional view taken along the plane 27—27 in FIG. 4;

FIG. 28 is a vertical sectional view taken along the line 28—28 in FIG. 24;

FIG. 29 is a top plan view of a left-hand corner cutting jig assembly;

FIG. 30 is a top plan view of a left-hand trim support assembly;

FIG. 31 is a top plan view showing the left-hand corner cutting jig assembly of FIG. 29 assembled on the left-hand trim support assembly of FIG. 30;

FIG. 32 is a front elevational view taken along the lines 32—32 in FIG. 31;

FIG. 33 is a bottom plan view of FIG. 31;

FIG. 34 is a vertical sectional view taken along the lines 34—34 in FIG. 31;

FIG. 35 is a vertical sectional view taken along the lines 35—35 in FIG. 31;

FIG. 36 is a vertical sectional view taken along the lines 36—36 in FIG. 31;

FIG. 37 is a vertical sectional view taken along the lines 37—37 in FIG. 31;

FIG. 40 is a top plan view showing an assembly including the apparatus shown in FIGS. 24 and 31 positioned for cutting the miters for both the right-hand and left-hand corners of the trim;

FIG. 41 is a fractional top plan view similar to FIG. 4 showing the corner clamping assembly of FIG. 20 as utilized in the modification of FIG. 40;

FIGS. 44 and 45 are top plan views similar to FIGS. 29 and 30 and illustrating another modification of the invention;

FIG. 46 is a front elevational view of a gauge utilized in cutting head jambs for doors;

FIG. 47 is a top plan view of a left-hand jig assembly corresponding to FIGS. 3 and 13 and illustrating the manner of using the gauge shown in FIG. 46;

FIG. 48 is a vertical sectional view taken along the lines 48—48 in FIG. 13;

FIG. 49 is a vertical sectional view taken along the lines 49—49 in FIG. 13;

FIG. 50 is a vertical sectional view taken along the lines 50—50 in FIG. 13;

FIG. 51 is a perspective view of a gauge for determining the length of trim members;

FIG. 52 is a perspective view of a locating gauge;

FIG. 53 is a sectional view taken along the lines 53—53 in FIG. 30; and

FIG. 54 is a top plan view of a head trim locating gauge.

Figure 5:
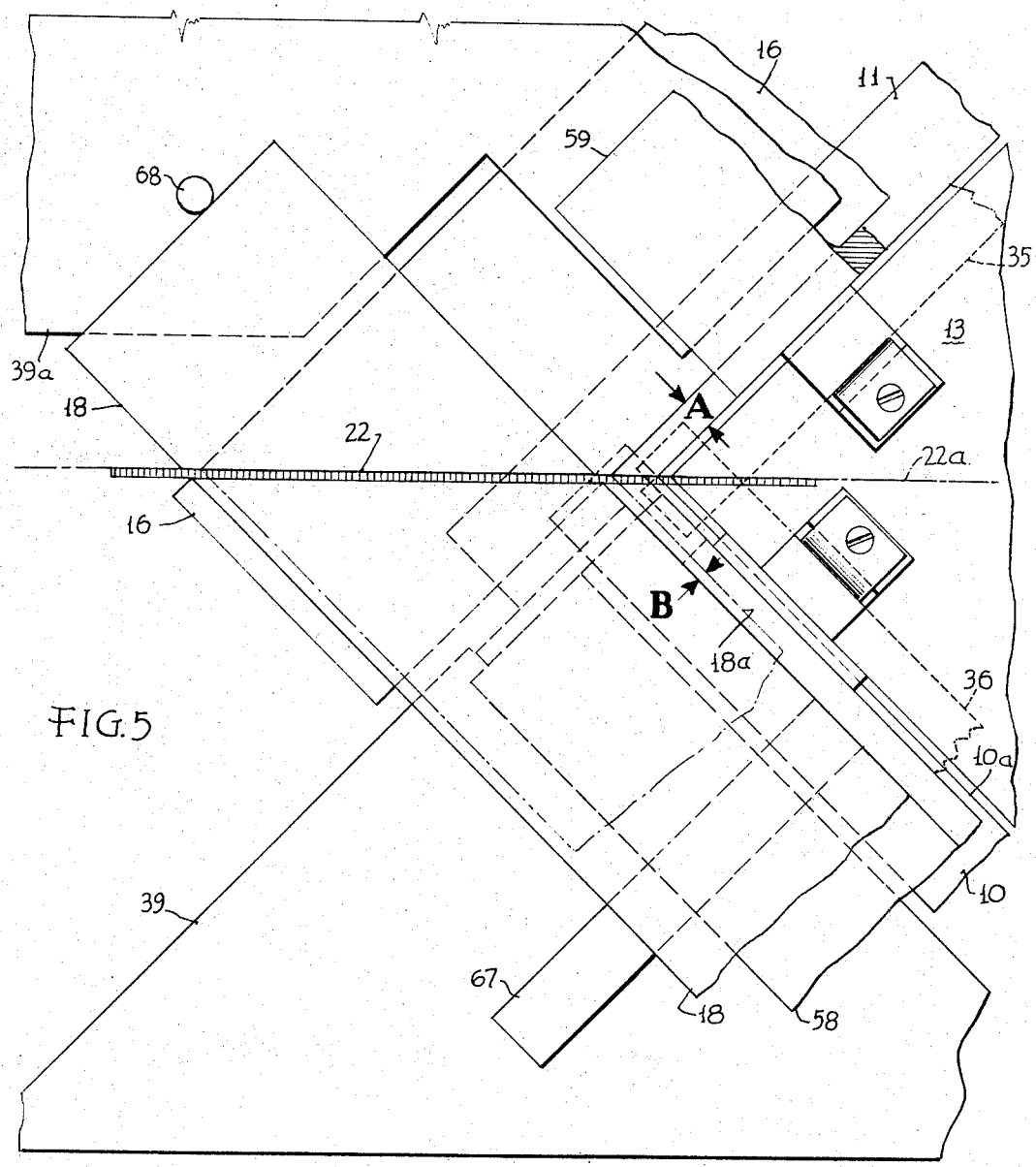
FIG. 5 is a fractional plan view showing the relative positions of a side trim member and the head trim member during a cutting operation.

While the present invention is applicable to cutting and assembling trim members and stops for doors and windows, it will first be described in connection with doors and particularly door and frame assemblies which have not as yet been installed in buildings. Referring to FIG. 1, there is shown a conventional door frame F comprising a head jamb 10, the opposite ends of which extend into dadoes which have been cut in a pair of side jambs 11 and 12. A door 13 has been positioned within the frame F in the position which it will normally have when installed on hinges attached to the frame. This is accomplished by a plurality of nails driven through the side jams 11 and 12 and through cardboard spacers and then into the edge of the door 13. The cardboard spacers have a thickness of 1/16" which corresponds to the normal spacing required for clearance between the edges of the door and the respective side jambs. The nails hold the door temporarily in place and, of course, are later removed when the hinges are installed. As may be seen in FIG. 1, a plurality of gauge members 15 are employed for gauging the distance of setback of the edge of the side trim members 16 and 17 with respect to the side jambs 11 and 12. Each of the gauge members 15 includes a vertical plate member 15a which has a thickness corresponding to the desired door clearance and is adapted to be positioned between the edge of the door and the adjacent face of a side jamb, FIG. 2. Secured to the plate member 15a is a spacer member 15b having a thickness corresponding to the desired setback of the side trim members 16 and 17. In a normal installation, the setback is 1/4" and thus the thickness of the spacer 15b is also 1/4". If it is desired to have a greater or lesser setback, the thickness of the spacer 15b can be varied accordingly. Secured to the spacer 15b and depending from the lower surface thereof is a pair of needle members 15c having sharp pointed ends which are adapted to penetrate the edge of the side jambs to assist in maintaining the gauge 15 in position and keep from having it displaced by engagement with the side trim member. The needle members 15c are adjustable as to length by means of their upper threaded ends which are received in the threaded openings in the spacer 15b, FIG. 2a. The needle members are locked in place by the set screws 15e. The gauge 15 is provided with a handle 15d so that the gauge may be readily inserted and removed from its gauging locations. As shown in FIG. 1, it is desirable to use a plurality of gauges 15, for example, three positioned at spaced relation along each side jamb. This insures that the side trim members will have a uniform setback throughout their length. The side trim members are held against the spacer member 15b of the gauges 15 and when in such position, nails are driven through the front faces of the side trim members to secure them to the respective side jambs. After the side trim members have been nailed in position as determined by the gauges 15, the latter are removed from the door and jamb assembly.

For convenience in working, it is desirable to place the door and jamb assembly of FIG. 1 on a horizontal surface such as a large work table. With such an arrangement, the door 13 will be supported in a horizontal plane and the side trim members 16 and 17 which have been secured to the edges of the side jambs 11 and 12, likewise, will be supported in a horizontal plane. The overall length of the side trim members 16 and 17 must be sufficient so that the head ends of the trim members will extend beyond the head jamb 10 a distance adequate for cutting the miters. Likewise, the lower ends of the side trim members must extend beyond the lower end of the door 13 a sufficient distance so that they will engage the floor when the door assembly is installed in a door opening. Normally, the lower end of the door 13 will have a clearance of approximately 3/4" with respect to the floor and thus the lower ends of the side trim members 16 and 17 should extend below the lower edge of the door by that amount. Likewise, the side jambs 11 and 12 extend below the lower edge of the door 13 by the same amount and thus the side trim members 16 and 17 should have their lower ends flush with the lower ends of the corresponding side jambs 11 and 12.

Referring now to FIG. 3, it will be seen that the side trim members 16 and 17 have been nailed in place and a head trim member 18 has been placed across the ends of the side trim members which extend beyond the head jamb 10. A pair of jig assemblies 19 and 20 are positioned at the respective right and left-hand corners at the head end of the door and frame assembly. The jig assemblies 19 and 20 have the dual function of supporting and clamping the respective adjacent ends of the head trim and side trim members in right angle positions and also of guiding a cutting tool 21 such as a circular saw blade 22 along a path which will cut off the respective ends of the trim members at the corners at an angle of 45°.

This geometric relationship between the path of the cutting blade 22 and the position of the trim members 16 and 18 with respect to the jamb members 10 and 11 is more clearly seen in FIG. 5. As may be seen in FIG. 5, a side trim member 16 has been secured to the side jamb 11 so that the front edge of the side trim member 16 has the desired setback, for example, 1/4" as indicated by the arrow heads A. This is the desired setback for all of the trim members 16–18 when they are secured to the respective jamb members. It will be noted that the head trim member 18 is positioned at right angles to the side trim member 16 and it has a setback with respect to the exposed face 10a of the head jamb 10 a distance greater than the dimension A. This additional distance indicated by the arrow heads B is determined by the thickness of the cutting blade 22. The path of the cutting blade 22 is determined by a pair of spaced tracks 23a and 23b which are adapted to support a carriage 24 for the saw 21, FIG. 3. The tracks 23a and 23b are so positioned on the jig assembly 19 that the path of the cutting blade 22 moves along the path as illustrated in FIG. 5.

As may be seen in FIG. 5, the upper side of the cutting blade 22 passes along a vertical plane 22a which bisects the angle formed between the side jamb 11 and the head jamb 10. The blade 22 is so positioned with respect to the jambs that it will cut through the end of the trim members without marking the joint formed between the side and head jamb members. When the saw blade 22 moves along the path as indicated in FIG. 5, it will be seen that it will cut off the end of the side trim member 16 at a 45° angle and the miter thus formed will extend precisely along the bisector 22a of the right angle formed between the head jamb 10 and the side jamb 11.

It will be noted that the head trim member 18 is supported in a plane which is above and parallel to the plane of the side trim member 16. The head trim member 18 is also positioned at right angles to the side trim members 16 and the side jamb 11. The miter on the head trim member 18 will be determined by the lower surface 22b of the saw blade 22 and after the blade 22 has pasesd through both of the trim members 16 and 18, it will be seen that the mitered ends of the trim members will be separated by a space corresponding to the thickness of the saw blade 22. Thus, if the head trim 18 were to be secured to the head jamb 10 in that position, the miter joint formed between trim members 16 and 18 would not have a perfect fit. However, after the cutting operation, the jig assembly 19 is removed and the head trim member 18 is moved toward the face 10a of the head jamb 10 by an amount corresponding to the spacing between the arrow heads B in FIG. 5. This movement will bring the miters on the corresponding ends of the trim members 16 and 18 into engagement thus compensating for the thickness of the cutting blade 22.

Figure 5A:
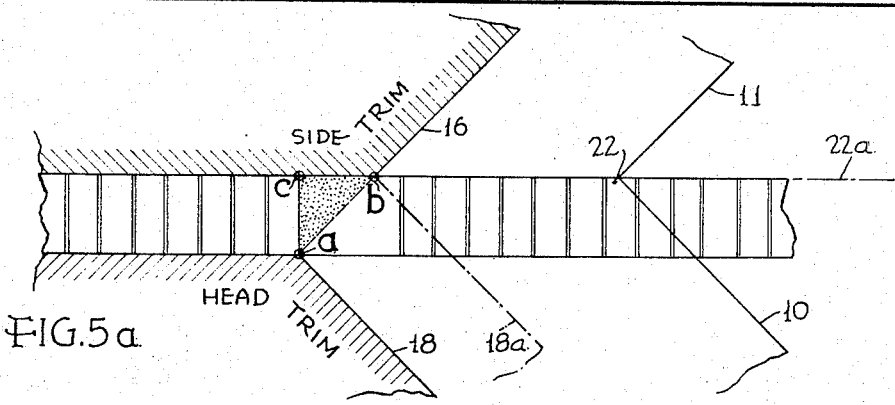
FIG. 5a is an enlarged fractional view of FIG. 5.

The geometric relationship between the cutting blade 22 and the trim members 16 and 18 and jamb members 10 and 11 has been illustrated in FIG. 5. In order that this relationship may be more clearly seen, reference is now to be had to FIG. 5a where the width of the cutting blade 22 has been shown on enlarged scale. In FIG. 5a it will be seen that the side jam 11 and the head jamb 10 are joined together at right angles to each other and the line 22a bisects this angle. The side trim 16 has been set back from the exposed face 11a of the side jam 11 and the dotted line 18a indicates the position that the head trim 18 will have when in final assembled position. It will be seen that the width of the cutting blade 22 is equal to the distance $ac$ and that the distance of additional offset of the head trim 18 is equal to the distance $ab$. Since the triangle $abc$ is an isosceles right triangle, the following trigonometric relationships exist:

(1) Angle $cab = 45°$
(2) Cosecant of $45° = \sqrt{2}$
(3) Cosecant of angle $cab = ab/ac = \sqrt{2}$
(4) $ab = ac\sqrt{2}$ where $ac$ equals the width of the saw blade and $ab$ equals the distance of the offset to compensate for the thickness of the saw blade. Thus, it will be seen that where the saw blade has a thickness of ⅛″ the head trim will be offset by an amount equal to ⅛$\sqrt{2}$″.

The cutting operation described above in connection with the right-hand jig assembly 19 is repeated for the left-hand jig assembly 20 and miters are cut on the corresponding ends of the side trim member 17 and the head trim member 18 in a similar manner. After the miters have been cut at both ends of the head trim 18, then the corner clamping assemblies 30 and 31, FIG. 4, are secured to the respective corners of the trim and screws are inserted in place to hold the joints together. As may be seen in FIG. 4, each of the corner clamping assemblies 30 and 31 is provided with a tool guide 30a and 31a, respectively, which is adapted to have inserted therein a combination drill and countersink tool for cutting openings in the edge of the head trim 18 to receive the screws. The screws are thereafter inserted through these guides 30a and 31a and tightened until they extend through the miter joints formed by the adjacent ends of the head trim and side trim members.

After the foregoing operations have been completed, the corner clamping assemblies 30 and 31 are removed and the door and jamb assembly is turned over so that the opposite edges of the frame F, remote from the door 13, are disposed upwardly ready for the application of trim members.

While the description thus far has been primarily concerned with the cutting of the miters on the trim strips, it is to be noted that the door stop members are also cut at the same time as the trim strip members. As is well understood in the art, a door stop comprises two side stop members which are adapted to be secured to the side jambs and a head stop member which is adapted to be secured to the head jamb at locations directly below the door 13 as shown in FIG. 1. That is to say, the door stop members are applied to the jambs at the lower side or reverse side of the door 13 in its position illustrated in FIG. 1. The side stop members are adapted to have their lower ends flush with the lower ends of the side trim members 16 and 17. The side stop members are adapted to be supported parallel to the side trim members and with the rear faces thereof in the same plane as the exposed faces of the side jamb members. This may be seen in FIG. 9 where one of the side stop members 35 is shown in its supported position relative to side jamb 11. The side stop member 35 is also shown in phantom in FIG. 5 and it will be seen that the upper surface 22a of the cutting blade 22 which bisects the angle at the corner formed by the side jamb 11 and head jamb 10 will cut off the head end of the side stop 35 at the same 45° angle. A similar side stop member 37 is adapted to be supported at the left-hand side of the door and jamb assembly with respect to the jib assembly 20, FIG. 13. The cutting blade 22′ of that assembly is adapted to pass through the trim members and the side stop member in manner similarly illustrated to that in FIG. 5 for assembly 19. Assembly 20 would be considered a left-hand assembly whereas the jig assembly 19 is considered as a right-hand assembly.

Further details of these jig assemblies will be described hereinafter.

After the door and frame assembly has had the trim members applied to one side as described above in connection with FIG. 4, the assembly as thus far completed is turned over on the table and the foregoing operations with respect to the trim members are repeated. The two side trim members are located by means of the gauges 15 as illustrated in FIG. 1. However, at this time, since the door 13 is at a lower level, the depending plate members 15a of the gauges do not extend between the door and the jamb. Instead, the gauges 15 are held in place by means of the needle members 15c.

Figure 9:
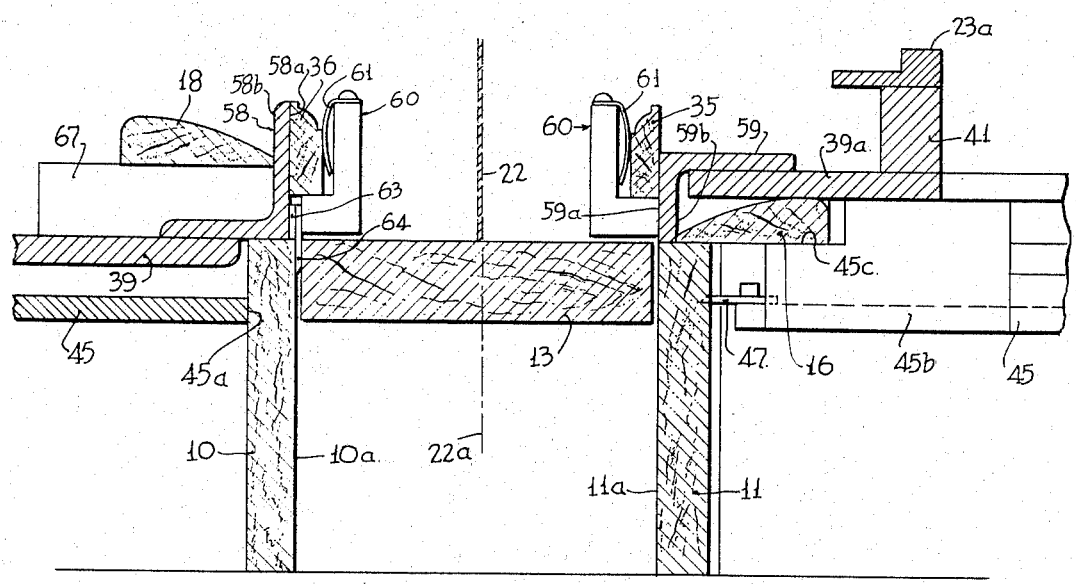
FIG. 9 is a vertical sectional view taken along the lines 9—9 in FIG. 6.

After the side trim members have been located in a manner illustrated in FIG. 1, they are nailed into position against the corresponding edges of the side jambs 11 and 12. The jig assemblies 19 and 20 are moved into position in the manner illustrated in FIG. 3 and the head trim and the adjacent side trim members are clamped in the positions shown. The head stop member 36 is positioned as shown in FIGS. 5 and 9 and its opposite ends are cut off at 45° when the cutting blades 22 and 22′ of the respective jig assemblies 19 and 20 are moved across the overlapping ends of the head trim and side trim members. It is to be noted in FIG. 5 that the head stop 36 which is shown in phantom, is positioned so that its rear face is beyond the face 10a of the head jamb member 10 against which it is adapted to be secured when installed. This distance corresponds to the distance identified by the arrow heads B in FIG. 5 and is determined by the thickness of the cutting blades 22 and 22′. Thus, when the head trim and the head stop members are installed in the door and jamb assembly, they will make perfect miter joints with the corresponding side trim and side stop members. The miter joints for the opposite side of the door trim are clamped together as illustrated in FIG. 4 and screws are inserted into the head trim member in the same manner as previously described in connection with the door trim for the other side of the door. It will be noted that the side stops 35 and 37 for the door are cut at the same time as the trim strips for one side of the door and the head stop 36 for the door is cut concurrently with the trim strips for the opposite side of the door. Thus, there is no lost motion and only two cutting operations are required for cutting the entire trim and door stops for a complete door and jamb assembly.

Figure 6:
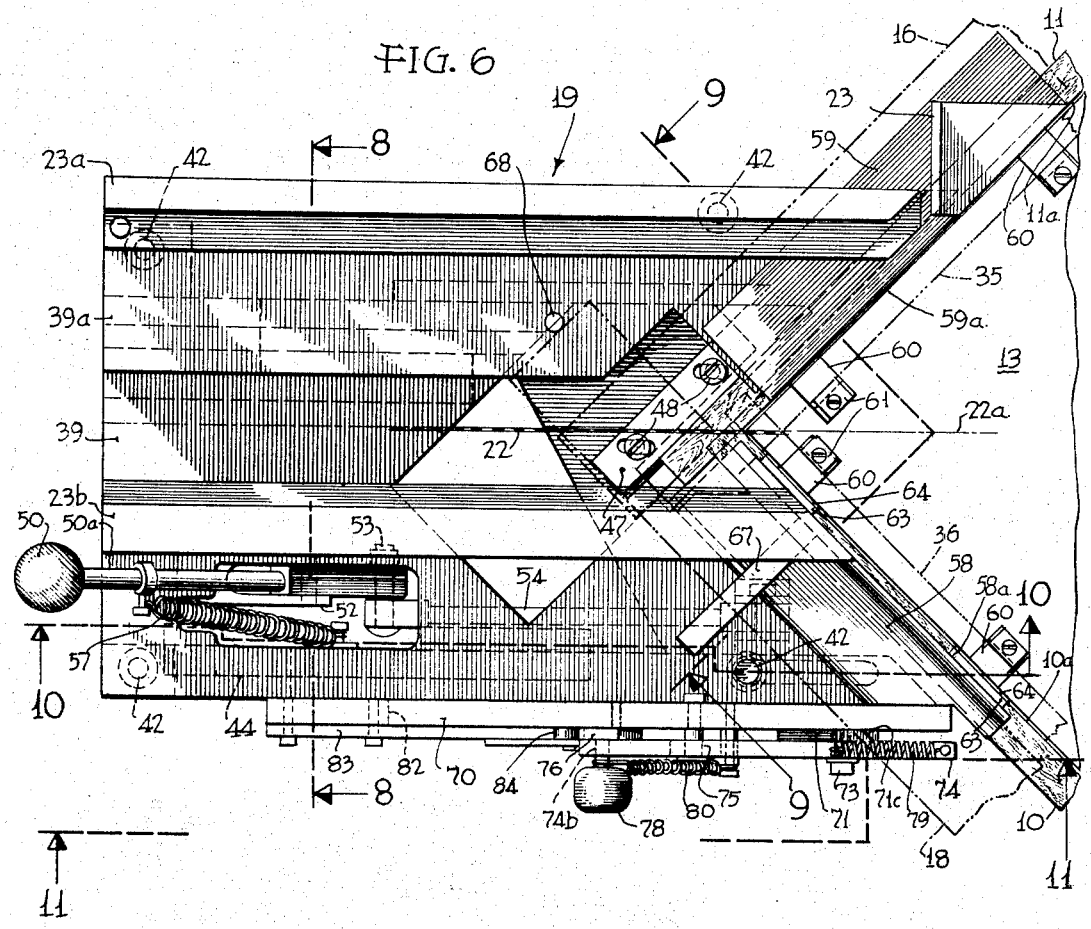
FIG. 6 is a top plan view of the right-hand corner cutting jig assembly shown in FIG. 3.

Having described the improved method of trimming a door, reference will now be made to the apparatus employed therein. As pointed out above, the right-hand and left-hand jig assemblies 19 and 20 are essentially the same in their construction. Where the assemblies have differences of construction, such differences will be pointed out. Reference will now be made to FIGS. 6-12 which illustrate the details of the right-hand jig assembly 19. FIG. 6 is a top plan view of the jig assembly 19 in position similar to that shown in FIG. 3 with the saw 21 and carriage 24 removed for clarity. The tracks 23a and 23b which support the carriage 24 have been shown in FIG. 6 and the line 22a which bisects the angle formed between the side jamb 11 and the head jamb 10 corresponds to the upper surface of the cutting blade 22 previously described and illustrated in connection with FIGS. 5 and 5a.

Figure 7:
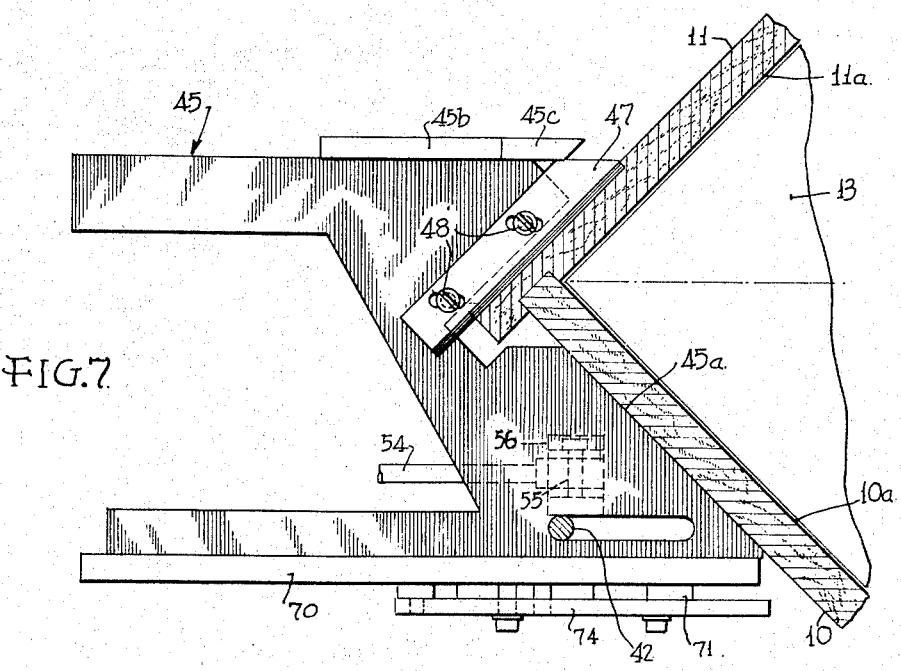
FIG. 7 is a fractional plan view taken along the plane 7—7 in FIG. 10.
Figure 8:
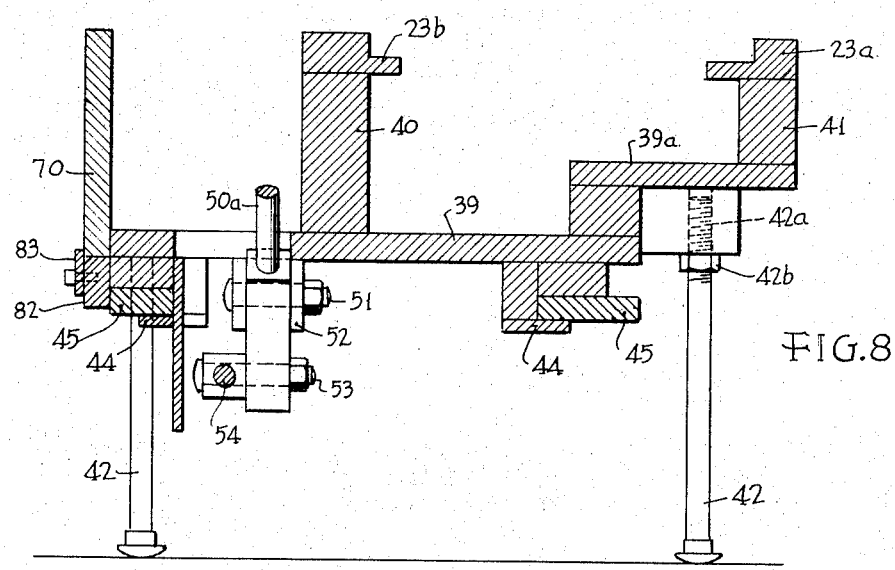
FIG. 8 is a vertical sectional view taken along the plane 8—8 in FIG. 6.

As may best be seen in FIG. 8, the jig assembly 19 includes a stationary frame comprising a bottom 39, 39a which supports two vertical members 40 and 41 which in turn support the spaced tracks 23a and 23b for the carriage 24 of the saw 21. The bottom 39, 39a of the jig assembly 19 is in turn supported by four legs 42 which are adjustable as to length and which are adapted to rest on the surface of the work table T. Each of the legs 42 is of generally similar construction having its upper end threaded as at 42a, FIG. 8, for threaded engagement with the frame of the jig assembly 19. A lock nut 42b is associated with each of the legs 42 to lock the legs in adjusted position. Also depending from the bottom of the member 39 is a pair of track members 44 which are adapted to support a movable slide member 45. Slide member 45 is best shown in FIG. 7. The forward end of the slide 45 is provided with an edge 45a which is adapted to engage the rear face of the head jamb 10, FIG. 7. Slide 45 also carries a blade member 47 which is adjustably secured thereto by a pair of screws 48. The blade member 47 is provided with enlarged openings for the screw members 48 so that its position may be adjusted relative to the edge 45a. In general, the angular relationship between the edge 45a and member 47 will be at right angles corresponding to the corner of a jamb and the blade member 47 is adapted to engage the rear face of side jamb 11 as shown in FIG. 7.

The slide member 45 is adapted to be reciprocated by means of a handle 50 on lever 50a which is pivoted at 51 on a bifurcated member 52 secured to the side of the vertical member 40. The lower end of the lever 50a is connected through pivot 53 to a link 54, the opposite end of which is pivotally connected at 55 to a bifurcated member 56 carried by the bottom surface of the slide 45, FIG. 10. A tension spring 57 applies a biasing force to the lever 50a in both the clamped position, FIGS. 6, 10 and 11 and the unclamped position, FIG. 12.

As may be seen in FIGS. 6 and 9, the bottom 39, 39a of the jig assembly 19 is adapted to support a pair of right angle members 58 and 59 which are positioned so that their vertical surfaces 58a and 59a are at right angles to each other, FIG. 6. It will be noted in FIG. 9 that the vertical surface 59a is in the same plane as the exposed face 11a of the side jamb 11. The surface 59a forms a locating surface against which the rear face of side stop 35 is positioned. The side stop 35 is held in place by means of bracket members 60 which in turn support spring members 61 which are curved to engage the front face of the stop member 35, FIG. 9.

As described above, it will be recalled that the rear face of the head stop member 36 was positioned beyond the face 10a of the head jamb member 10 against which it is adapted to be secured when installed. This distance is determined by the thickness of the cutting blade 22. A spacer 63 having this predetermined thickness is secured to the surface 58a of the support member 58 as shown in FIG. 9. Thus, the surface 58a is disposed beyond the exposed face 10a of the head jamb by an amount corresponding to the thickness of the spacer 63. To accurately locate the support 58 with respect to the head jamb 10, there is provided a pair of depending plate members 64, FIGS. 6 and 9, having a thickness corresponding to the clearance between the face 10a of the head jamb 10 and the edge of the door 13. Thus, as may be seen in FIG. 10, when the handle 50 is moved from the unclamped or phantom line position to the clamped or solid line position, the slide 45 will move forward so that its leading edge 45a will cooperate with members 64 to clamp the opposite faces of the head jamb 10 therebetween. The head door stop member 36, FIG. 9, is adapted to be supported with its rear face against the locating surface 58a by means of bracket 60 and spring members 61 as shown in FIG. 9. When the handle 50 is moved into the clamping position of FIGS. 9 and 10, it will be seen in FIG. 9 that the knife member 47 tightly engages the rear face of the side jamb 11 thus locking the jig assembly 19 securely to the right-hand corner of the door frame. When this occurs, it will be seen that a vertical member 45b of the slide 45 moves beneath the rear edge of the side trim member 16, FIG. 9, to support the side trim member 16 by means of horizontal surface 45c. It will be noted that surface 45c is in the same horizontal plane as the upper edge of the side jamb 11. Thus, the side trim member 16 will be maintained in its proper position during the miter cutting operation.

Figure 10:
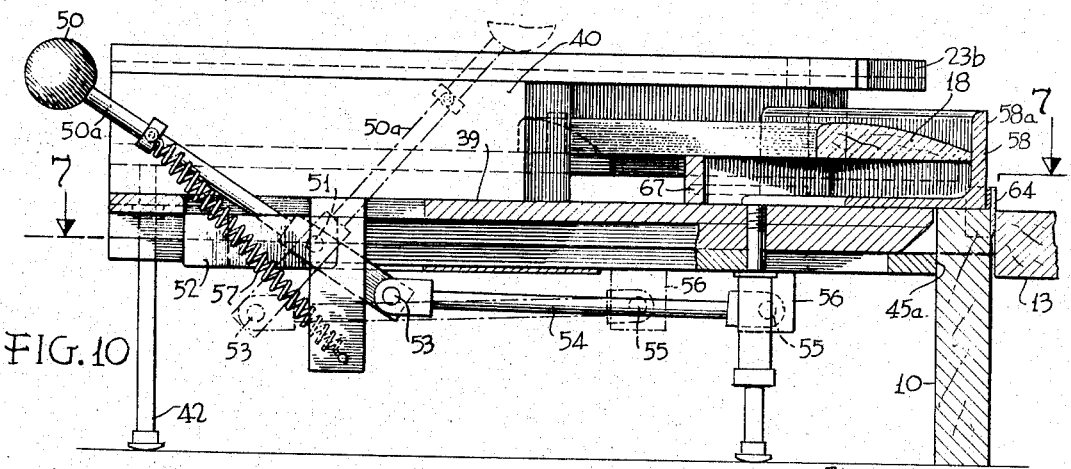
FIG. 10 is a vertical sectional view taken along the lines 10—10 in FIG. 6.

After the jig assembly 19 has been clamped to the door frame by moving the operating handle 50 to the full line position as shown in FIG. 10, the head trim member 18 is then ready to be inserted in the jig. As may be seen in FIGS. 6 and 9, the bottom 39 carries a supporting block 67 on which the head trim 18 is adapted to rest. The upper surface of member 67 is in the same horizontal plane as the upper surface of the upper section of the bottom 39a, FIGS. 6 and 9, and thus these surfaces cooperate to form the support for the head trim member 18. A stop pin member 68 projects from the bottom section 39a, FIG. 6, to locate the end of the head trim member 18 and insure that it will extend beyond the cutting path of the cutting member.

The slide 45 also carries a clamping assembly for clamping the head trim 18 in its supported position preparatory to cutting the miter. The head trim clamping assembly is carried by a vertical plate 70 which in turn is carried by the slide 45, FIGS. 11 and 12. FIG. 12 illustrates the head trim clamping assembly in its unclamped position and it is to be noted that the parts will have this position whether the handle 50 for the jamb clamping assembly is in the clamped or unclamped position. The head trim clamping assembly comprises a link 71 which is pivoted to the vertical member 70 by fixed pivot 72. The upper end of link 71 is provided with a slot 71a which is adapted to receive one end of a slide pin or pivot 73, the other end of which extends into a slot 74a in a link 74. A fixed pin 75 carried by the vertical plate 70 also extends into the slot 74a. The opposite end of link 74 is provided with a pivot 74b to which is connected a link 76 pivoted to the vertical support 70 at a pivot 77. A handle or knob 78 for operating the head trim clamping assembly likewise is carried by the pivot 74b. Spring biasing forces are provided for the clamping assembly by means of springs 79 and 80.

As described earlier in the specification, the side trim members and the head trim member will have a setback from the face of the corresponding jamb members which is ordinarily in the order of ¼". This setback is determined by the gauges 15 previously described in connection with FIGS. 1 and 2. This setback dimension also corresponds to the thickness or spacing between the surfaces 59a and 59b of the vertical section of the angle member 59 shown in FIG. 9. It will be noted that the front surface 59a of this section is flush with the face 11a of the jamb 11 and the rear surface 59b engages the front edge of the side trim member 16. Similarly, the vertical portion of the angle member 58 in FIG. 9 has a thickness or spacing between surfaces 58a and 58b corresponding to the ¼" setback for the head trim member 18. However, the front surface 58a does not lie in the same vertical plane as the face 10a of the head jamb 10 as compensation has been made for the thickness of the saw blade by inserting the spacer 63. The vertical surfaces 58b and 58a of the angle member 58 serve to locate both the head trim member 18 and the head door stop member 36 in a similar manner to the vertical surfaces 59b and 59a of right angle member 59 which locate the side trim member 16 and the side stop member 35, FIG. 9.

To operate the head trim clamping assembly, the clamp is first in the unclamped or retracted position shown in FIG. 12. The head trim 18 is inserted so that it rests on the support 67 and the forward edge of the head trim 18 engages the rear vertical surface 58b of angle iron 58. As described above, this rear vertical surface 58b has been adjusted so that it is positioned behind the face 10a of the head jamb 10 a distance corresponding to the desired setback of the trim plus an additional distance to compensate for the thickness of the cutting blade. To clamp the head trim 18 in its supported position, the knob 78 is rotated in a clockwise direction from the position shown in FIG. 12 to the position shown in FIG. 11. This causes the forward end of link 74 to move so that its surface 74c engages the upper surface or face of the trim member 18, FIG. 11. It will be noted that the springs 79 and 80 have been moved to an over-center position with respect to the pivots 73 and 77, and thus the biasing force of the springs is acting in a forward and downward direction. This causes the surface 74c to press in a downward direction on the head trim member 18 and also causes the forward edge 71c of link 71 to move against the rear edge of the head trim member 18. Thus, it will be seen that the clamping surfaces 74c and 71c of the head trim clamping assembly cooperate to clamp the head trim 18 against the vertical surface 58b and the horizontal supporting surfaces on members 67 and 39a.

Figure 11:
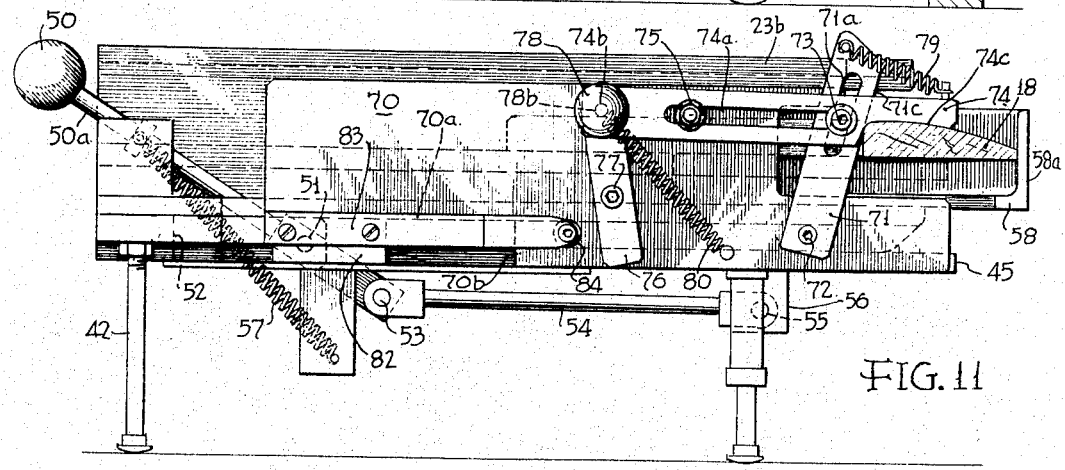
FIG. 11 is a front elevational view looking in the direction 11—11 in FIG. 6.
Figure 12:
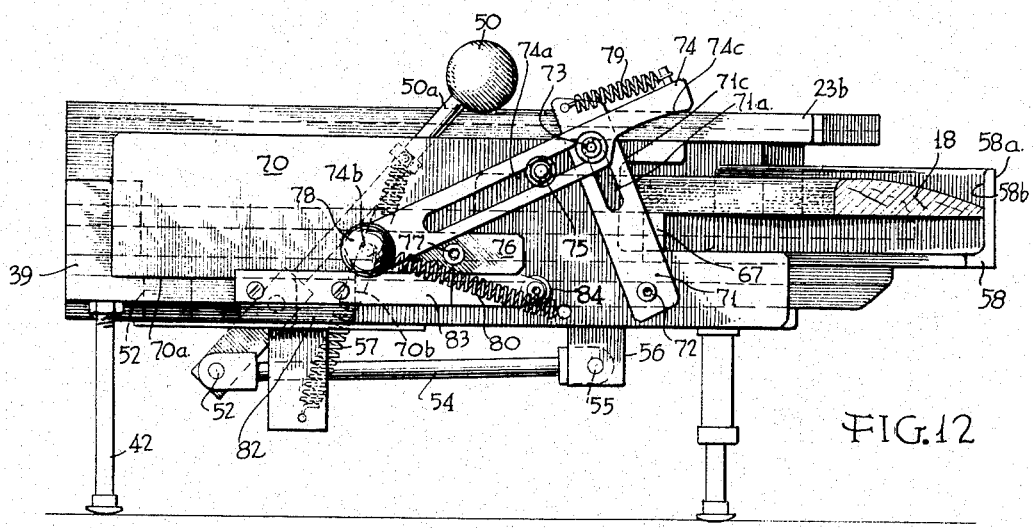
FIG. 12 is a view similar to FIG. 11 showing the clamping assembly in unclamped position.

While the head trim clamping assembly is moved into clamped position by means of the operating knob 78, it is automatically unclamped with the operation of the clamping handle 50 moving from its clamped position of FIG. 11 to its unclamped position of FIG. 12. As may be seen in FIGS. 6, 8, 11 and 12, a block 82 is secured to the bottom member 39 of the jig. A notch located at the rear end of member 70 and formed by a horizontal surface 70a and a vertical surface 70b, is adapted to receive the block 82. The horizontal surface 70a is adapted to slide on the upper surface of block 82 both in the clamped and unclamped positions of FIGS. 11 and 12. The vertical surface 70b only engages the end of block 82 when the head jamb clamping assembly is in the unclamped position shown in FIG. 12. The block 82 provides a support for a member 83 which at its forward end carries a roller 84. As the handle 50 is moved in a clockwise direction from the clamped position shown in FIG. 11 to the unclamped position shown in FIG. 12, the slide 45 moves to the left and carries with it the vertical member 70 which in turn supports the head trim clamping assembly. During this movement, the lower end of the link 76 will engage the roller 84 causing the operating knob 78 to pivot in a counterclockwise direction against the bias of springs 79 and 80 thereby causing the floating pivot pin 73 to move upwardly in the slot 71a of link 71 and release the clamping surfaces 74c and 71c from engagement with the head trim 18. When the handle 50 is moved to the unclamped position shown in FIG. 12, the surface 70b of the vertical member 70 will engage the forward end of the stop block 82 at which time both the jamb clamping assembly, which is controlled by handle 50 and the head trim clamping assembly will have been moved to their unclamped positions. Thus, it will be seen that the handle 50 will automatically release the head trim clamping assembly.

Figure 13:
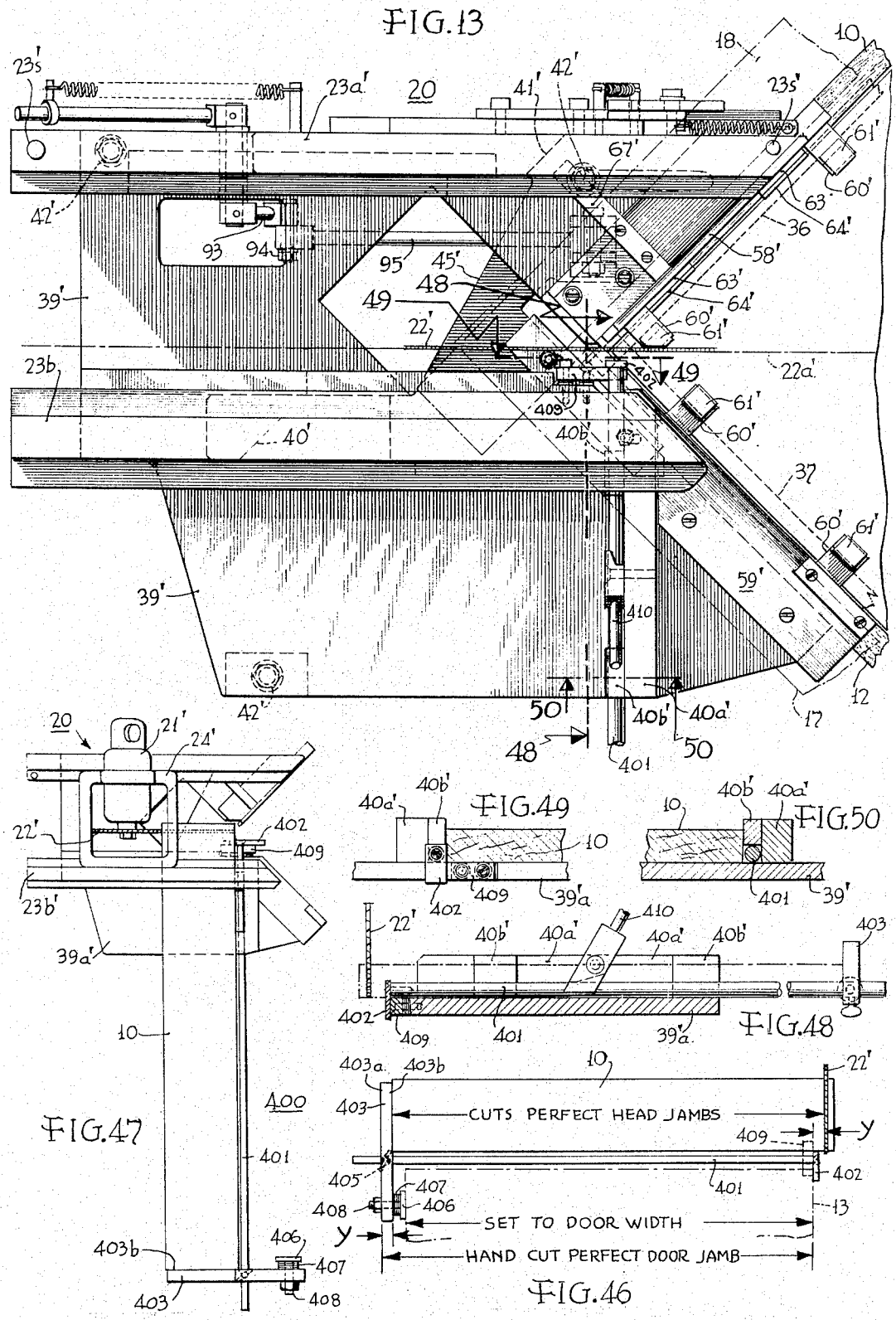
FIG. 13 is a top plan view of the left-hand corner cutting jig assembly shown in FIG. 3.
Figure 14:
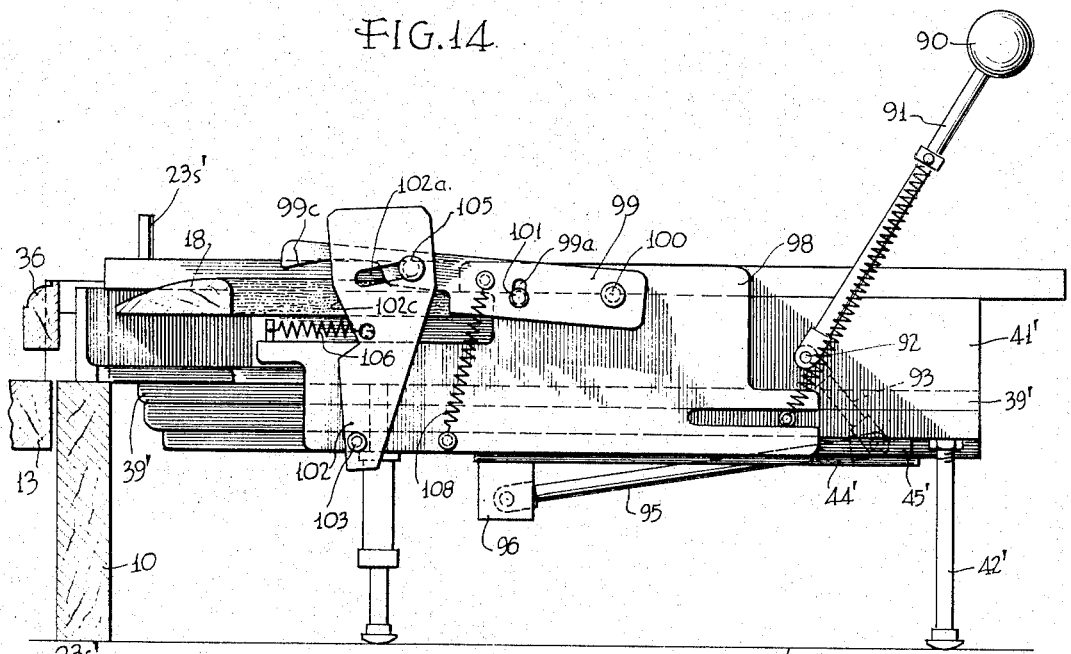
FIG. 14 is a rear elevational view of the jig assembly shown in FIG. 13 with the clamping assembly in unclamped position.
Figure 15:
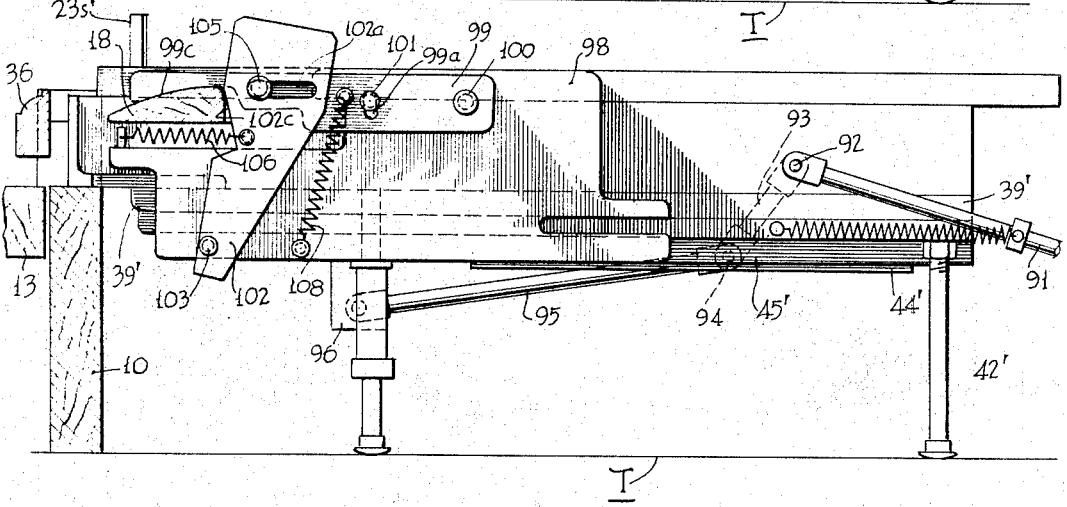
FIG. 15 is a view similar to FIG. 14 showing the clamping assembly in clamped position.

The left-hand jig assembly 20 for clamping the left-hand corner of the door frame and trim may best be seen in FIGS. 13–15. This jig assembly 20 is basically similar to the jig assembly 19 and the corresponding parts of the jig assembly 20 have been identified by the same reference characters with the addition of a prime. One difference between the jig assembly 20 and the jig assembly 19 is that the jig assembly 20 includes a different clamping assembly which enables the clamp for the jamb members and the clamp for the head trim member to be both clamped and unclamped with the same operating lever. Jig assembly 20 also includes a provision for cutting off trim or jamb members with a straight cut and for cutting a head jamb to required length.

As may be seen in FIG. 13, the jig assembly 20 includes a stationary bottom member 39' having a raised section 39a' which is somewhat larger than the corresponding section 39a of jig assembly 19. The jig assembly 20 is supported by a plurality of legs 42' which are of the same construction as the corresponding legs 42 in jig assembly 19. In view of the fact that the section 39a' is wider than the corresponding section in jig assembly 19, it is only necessary to use three legs 42' for the jig assembly 20. The raised section 39a' is supported in a horizontal position and provides a supporting surface for receiving jamb members or trim members. The tracks 23a' and 23b' are adapted to support a saw 21' having a cutting blade 22', the lower surface of which, as shown in FIG. 13, is adapted to move along the line 22a' which bisects the right angle formed between the head jamb 10 and the side jamb 12. Thus, it will be seen that this relationship of the saw blade with respect to the bisector of the angle is just the reverse of the position of the saw blade 22 shown on enlarged scale in FIG. 5. The reason that the parts are reversed is because the jig 20 is a left-hand assembly as distinguished from jig 19 which is a right-hand assembly. The track 23a' is carried by a block 41', the forward end of which ends at the inclined broken line as shown in FIG. 13. The track 23a' includes stops 23s' to limit the movement of the saw carriage. The opposite track member 23b' is supported by a shorter block 40', the forward end of which ends at the inclined line as shown in FIG. 13. The forward end of the track 23b' is carried by a block 40a' which is perpendicular to the path 22a' of saw 22'. The block 40a' is supported by the section 39a'. Thus, it will be seen that there is an opening beneath the track member 23b' between the end of the support block 40' and the opposite support block 40a'. The blocks 40' and 40a' are of the same height and this height is sufficient to permit a jamb or a trim member to be inserted beneath the track 23b'. The member 40a' carries a pair of locating blocks 40b' against which the jabs or trim members are held while the cutting blade 22' moves across the jamb or trim members to cut square ends thereon in cutting such members to required length. The arrangement for gauging the correct length of head jamb will be described hereinafter with reference to a gauge that fits under the blocks 40b' on bottom section 39a'.

As shown in FIGS. 13–15, the jig assembly 20 includes a bottom slide member 45' which is adapted to slide on a pair of tracks 44' which depend from the lower side of the bottom member 39'. The slide member 45' carries a locating blade 47', FIG. 13, which is adapted to engage the rear face of the left-hand side jamb 12. The member 47' is similar to member 47 previously described in connection with the jig assembly 19. The locating member 47' cooperates with a right angle locating surface, not shown, on slide 45' but such surface is similar to the surface 45a shown in FIGS. 7 and 10 and is adapted to engage the rear side of the head jamb 10. The bottom member 39', FIG. 13, supports the right angle member 58' which in turn carries the support 67' for the head trim member 18. It will be recalled from the earlier description that the member 67, FIG. 6, of jig assembly 19 supports the opposite end of head trim member 18. The member 58', FIG. 13, is provided with spacer members 63' and locating members 64' whose functions are the same as the corresponding members in the jig assembly 19, FIGS. 7 and 9. The bracket members 60', FIG. 13, carried by the angle member 58' are provided with spring members 61' which are adapted to hold the left-hand end of the head stop 36 in place during the cutting operation. The raised section 39a' of the frame carries the angle member 59', FIG. 13, the forward face of which is flush with the face of the side jamb 12. The side trim 17 is adapted to be supported beneath the angle member 59' in a manner similar to that shown in FIG. 9 for jig assembly 19. The angle member 59' is provided with brackets 60' and spring members 61' which in turn hold a side stop member 37 during a cutting operation. As pointed out above, the side stop members 35 and 37 are not cut at the same time as the head stop member 36.

As may be seen in FIGS. 13–15, the operating mechanism for the movable slide 45' comprises a handle 90 carried by one end of a lever arm 91, the opposite end of which is fixed to a shaft 92 which is journaled in the support member 41'. The opposite end of the shaft 92 has secured thereto one end of a link 93. The opposite end of link 93 is pivotally connected at 94 to a link 95 the opposite end of which is pivotally connected to a bifurcated member 96 secured to the bottom of the slide 45'. Secured to the edge of the slide 45' is vertical member 98 which carries the clamping assembly for the left-hand end of the head trim member 18. The function of this clamping assembly on jig assembly 20 is the same as the clamping assembly on the jig assembly 19, however, the construction is somewhat different. It is to be understood that these clamping assemblies for the head jamb may be used on either of the jig assemblies 19 and 20 and if desired they both may be identical. The head jamb clamping assembly on jig 20 is adapted to be automatically operated both into clamping and unclamping positions by means of the handle 90.

As may be seen in FIGS. 13–15, the vertical member 98 supports a lever 99 on pivot 100. The plate 98 also carries a pin 101 which is adapted to extend through a substantially vertical slot 99a in lever 99. A lever 102 is pivoted at its lower end to the vertical member 98 by a pivot pin 103, FIG. 14 and 15. The upper end of lever 102 is provided with a transverse slot 102a through which extends a pin 105 which is carried by the substantially horizontal lever 99. The forward end of the lever 99 is provided with a curved surface 99c which is adapted to engage the upper surface of the head trim member 18, as shown in FIG. 15. The forward edge of the vertical lever 102 likewise is provided with a clamping edge 102c which is adapted to engage the rear of the head trim member 18 as shown in FIG. 15. Thus, it will be seen that the clamping surfaces 99c and 102c in FIGS. 14 and 15 are adapted to function in the same manner as the corresponding clamping surfaces 74c and 71c in FIGS. 11 and 12 for the right-hand clamping assembly of jig assembly 19. A spring 106 is connected at its opposite ends to the lever 102 and the vertical member 98. A second spring 108 is connected at its opposite ends to the vertical member 98 and to the intermediate section of the lever 99. When the operating handle 90 is moved from the unclamped position of FIG. 14 to the clamped position of FIG. 15, the lever 91 moves in a clockwise direction causing the linkage connected thereto to move the slide 45' to the left as viewed in FIG. 15. When the slide 45' nears its forward position, the surface 102c on lever 102 will engage the rear of the head trim member 18 causing the lever 102 to pivot in a clockwise direction from the position shown in FIG. 14 to the position shown in FIG. 15. When this occurs, it will be seen that the spring 106 will be stretched and it will also be seen that the slot 102a in lever 102 will be effective on the pin 105 to cause the latter to move downward and bring the clamping surface 99c into engagement with the top surface or face of the head trim member 18, FIG. 15. When the handle 90 is moved in a counterclockwise direction to the position shown in FIG. 14, the slide 45' moves to the right and carries with it the vertical member 98 and the head trim clamping assembly. This causes the clamping surface 102c on lever 102 to move out of engagement with the rear of the head trim member 18 and the spring 106 causes the lever 102 to pivot in a counterclockwise direction. This movement causes the slot 102a to move to the left with respect to pin 105 raising the latter and thus causing the clamping surface 99c to move up and out of engagement with the top surface of the head trim member 18 as shown in FIG. 14.

Figure 16:
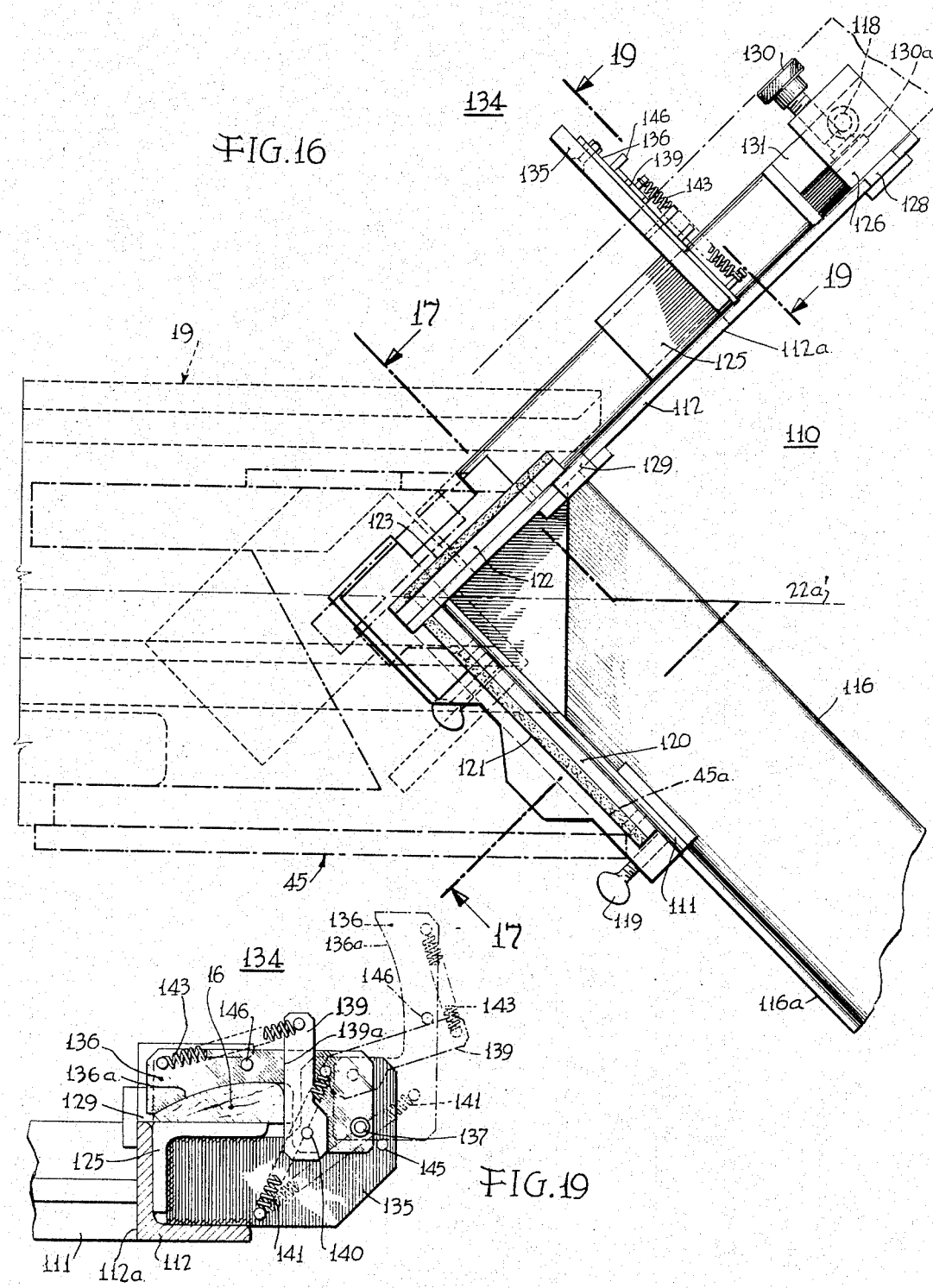
FIG. 16 is a top plan view of a support assembly for the right-hand jig assembly of FIG. 6.
Figure 17:
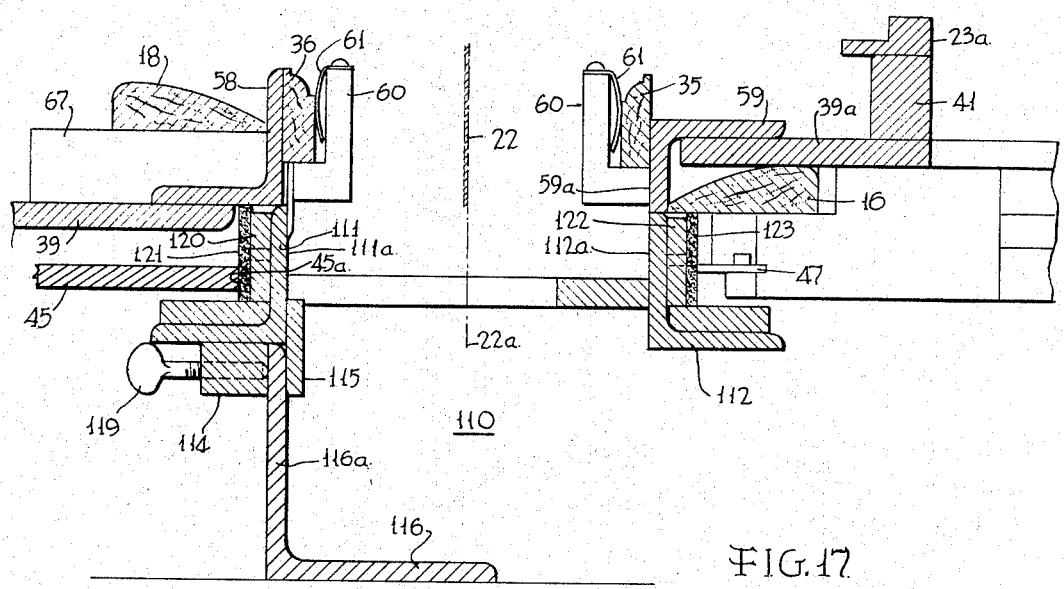
FIG. 17 is a vertical sectional view taken along the lines 17—17 in FIG. 16.
Figure 18:
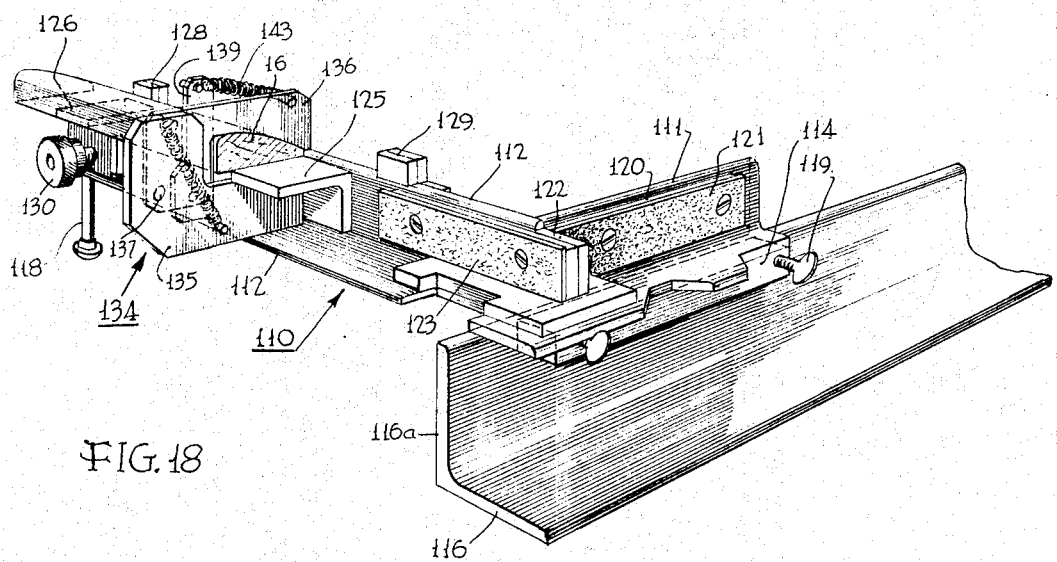
FIG. 18 is a perspective view of the support assembly taken from the left-hand side of FIG. 16.

While the present invention has been described with reference to FIGS. 1–15 with reference to cutting and assembling trim strips and door stops on a door frame prior to its installation in a building, it is to be understood that the present invention is also applicable to cutting and assembling trim members and door stop members for doors which have already been installed in a building. Such a system is illustrated in FIGS. 16–18 and special support assemblies are utilized in place of the jamb members which comprise the door frame. The support assembly 110 shown in FIG. 16 takes the place of the normal right-hand corner formed by the right-hand side jamb and head jamb previously shown in FIG. 6. The same right-hand jig assembly 19 is utilized in the arrangement shown in FIG. 16 and various parts thereof have been illustrated in phantom lines so as not to obscure the parts of the support assembly 110. As may be seen in FIGS. 16–18, the support assembly 110 is of L-shaped configuration and comprises a pair of angle members 111 and 112 joined together at one of their ends to form a right angle. The right angle member 111 is provided with spaced block members 114 and 115 which are adapted to receive therebetween a vertical section 116a of a right angle iron 116. The right angle iron 116 has a length greater than the width of any of the doors for which trim is to be assembled. The angle member 116 in cooperation with the leg 118, FIG. 18, is adapted to support the assembly 110 in a horizontal position. The block 114 is provided with a pair of thumb screws 119 which are threadedly received therein and are adapted to be moved into engagement with the vertical section 116a, FIG. 17. While a right-hand support assembly 110 has been illustrated in FIGS. 16–18, it is to be understood that in practice there will be utilized a corresponding left-hand support assembly of similar construction and secured to the right angle member 116 at a location spaced from member 112 by a distance corresponding to the width of the door plus the clearance.

The front surface of 111a of member 111 corresponds to the face of the head jamb and to the rear of this surface 111a are secured a pair of blocks 120 and 121 having a thickness such that the combined thickness of the three vertical sections as shown in FIG. 17 have a total thickness equal to that of the thickness of a normal head jamb. Similarly, the surface 112a on member 112 corresponds to the face of a side jamb member and the pair of blocks 122 and 123 which are secured thereto have a combined thickness so that the total thickness of the three vertical sections equal the thickness of a normal side jamb member. Since the member 123 is adapted to be engaged by the edge of blade member 47 of the jig assembly 19, it is preferably made from a suitable material such as fiberboard. The member 121 carried by angle member 111 is adapted to be engaged by the edge 45a of slide 45 and thus member 121 may also be made of fiberboard material. However, since the edge 45a is not sharp, the member 121 may be made of metal if desired. FIG. 17 is a view similar to FIG. 9 and thus shows the manner in which the right-hand jig assembly 19 is supported by the support assembly 110. Since the jig assembly 19 in FIG. 17 is the same as that shown in FIG. 9, the parts have been provided with identical reference characters.

As may be seen in FIGS. 16 and 18, the side trim member 16 is supported in a horizontal plane by a pair of horizontal members 125 and 126 carried by member 112. The forward edge of the side trim member 16 engages a pair of locating blocks 128 and 129 which are also carried by member 112, FIGS. 16 and 18. It will be seen that the locating members 128 and 129 have a thickness corresponding to the setback of the trim from the face of the jamb, the latter being identified by reference character 112a, FIG. 16.

It will be noted that member 112 is relatively short and is not as long as a side jamb member. In order to locate the proper length for the bottom of the side trim member 16, there is provided a clamp 130 which is threaded into a block 131 carried by member 112. The threaded member of clamp 130 is provided with a pad 130a which is adapted to cooperate with the vertical section of the right angle member 112 to clamp an extension therebetween. The extension, not shown, may be in the form of a metal rod or preferably may be a wooden stick having a length such that the combined length of the stick and member 112 will be greater than the length of the door jamb for which the trim is being cut. A gauge is secured to the lower end of the stick and the side trim 16 is adapted to abut the gauge at its lower end thus properly locating the bottom of the trim strip 16 with respect to the support 110 and the jig assembly 19. The upper end of the trim member 16 extends into the jig assembly 19 in the manner previously described in connection with FIGS. 5 and 6.

The side trim member 16 is adapted to be held in place on the horizontal supporting members 125 and 126 with its forward edge against the locating blocks 128 and 129 by suitable clamping means. While this may be accomplished by means of an L-shaped bracket and spring member carried by member 125 and similar to bracket member 60 and spring member 61 of FIG. 17, it is preferable to use a retractable clamp such as illustrated in FIGS. 16, 18 and 19. The side trim clamp 134 shown in these figures comprises a supporting plate 135 which is secured in a vertical position with respect to the horizontal member 125 as by welding. An arm 136 is pivoted to the plate 135 at pivot 137. The arm 136 has a curved surface 136a which is adapted to engage the upper face of the side trim member 16. A second arm 139 is pivoted at 140 to arm 136. The arm 139 is provided with a forward edge 139a which is adapted to engage the rear edge of the trim strip 16 as shown in FIGS. 18 and 19. A spring 141 is pinned to the support plate 135 and to the arm 136 and a second spring 143 is pinned to one end of arm 136 and to one end of arm 139, FIG. 19. The springs 141 and 143 are so positioned as to apply a downward force on the face of the trim member 16 to hold the back of the trim member against the supporting surface 125 and to apply a force to the rear edge of the trim member 16 so as to hold the front edge against the locating members 129 and 128.

When the side trim clamp 134 is moved to open position as shown by the phantom lines in FIG. 19, the arm 136 is pivoted to a substantially vertical position with its bottom edge resting on a pin 145 carried by the plate 135. During movement of the lever arm 136 to the phantom line position in FIG. 19, a pin 146 carried by the lever arm 136 will engage the forward edge 139a of lever arm 139 and move it to the position shown by phantom lines in FIG. 19. It will be seen that this is an over-center position with respect to the pivot 137 and thus the spring 141 will hold the clamp in the open or phantom line position until it is closed by an operator. A side trim clamp of such construction enables the side trim members to be readily inserted and withdrawn during a miter cutting operation.

The miters for the right-hand corner of the trim on trim members 16 and 18 are cut by the jig assembly 19 in the same manner as described above in connection with FIGS. 1–12. To cut the miters on the left-hand corner of a trim assembly, the left-hand jig assembly 20 is used in the same manner as shown in FIGS. 13–15. However, in such arrangement, the jig assembly 20 would be supported on a left-hand support assembly similar in construction to the right-hand support assembly 110 described and illustrated in FIGS. 16–19. With the modification shown in FIGS. 16–19, it will be noted that the stop members for the door can also be cut concurrently with the trim members the same as in the modification disclosed in FIGS. 1–15 since the jig assemblies 19 and 20 provide the support for the stop members. The modification shown in FIGS. 16–19 is also suitable for cutting the trim members and stop members for windows.

After the trim members and stop members have been cut in the manner described above, the door stop members 35–37 may be assembled to the faces of the respective jambs 11, 10, 12 in the positions adjacent the face of the door 13. Likewise, after the miter cutting operations, the head trim 18 is ready to be assembled with the corresponding side trim members 16 and 17. Such an arrangement is shown in FIG. 4 where corner clamping assemblies 30 and 31 utilize the novel concept of locating the trim members with respect to their faces rather than their bottoms. These assemblies 30 and 31 are of similar construction with the exception that assembly 30 is a right-hand assembly and assembly 31 is a left-hand assembly due to the positions of the tool guides 30a and 31a. A universal corner clamping assembly 30' including both tool guides 30a and 31a but otherwise similar to assemblies 30 and 31 is shown in FIGS. 20–23. It is only believed necessary to describe one of the corner clamping assemblies in detail. The details for the corner clamping assembly 30' applied to a right-hand trim corner are shown in FIGS. 20–23.

As may be seen in FIGS. 20 and 21, the corner clamping assembly 30' comprises a frame including a top plate 150 beneath which is secured a pair of blocks 151 and 152 which are arranged with their locating surfaces 151a and 152a at right angles to each other for engagement by the rear edges, respectively, of the trim members 16 and 18. The faces of the trim members 16 and 18 are adapted to be engaged by locating members 154 and 155 which are secured to the underside of plate 150 by means of screws 157 and wing nuts 158. The screws 157 extend through slots 159 and 160. The slots 159 are perpendicular to the locating surface 151a and the slots 160 are perpendicular to the locating surface 152a. The locating members 154 and 155 have a half round surface as best shown in FIGS. 21 and 23 and the slots 159 and 160 enable the locating members 155 and 154 to be positioned relative to the plate 150 for locating trim members of any configuration.

Secured to the underside of block 152 is a bearing block 164 through which extends a shaft 165. One end of the shaft 165 is secured to an end of an operating lever 166 having a knob 167. The opposite end of shaft 165 is secured to a cam 168 which is adapted to be rotated in a vertical plane against the bottom surface of the head trim 18.

A similar bearing block 174 is attached to the lower surface of member 151. A shaft 175 extends through the bearing block 174 and the opposite ends of the shaft 175 are connected to a lever 176 and a cam 178. The outer end of lever 176 is provided with a knob 177 for ease of operation. As viewed in FIG. 21, both of the levers 166 and 176 and their corresponding knobs 167 and 177 are adapted to be rotated in an upward direction as illustrated by the arrow on cam 178. When the lever 176 and the cam 178 move from the phantom line position in FIG. 21 to their full line position, it will be noted that the cam 178 applies a force to the underside of the side trim member 16, such force acting not only in an upward direction but also in a longitudinal direction toward the corner of the clamping assembly 30'. Likewise, when the lever 166 is moved to its clamped position as shown in FIG. 21, the cam 168 applies a force to the underside of the head trim member 18, such force acting in an upward direction and also in a longitudinal direction toward the corner of the corner clamping assembly 30'. This combined action of the forces causes the mitered ends of the trim members 16 and 18 to be forced into tight engagement.

With the cams 168 and 178 both acting in vertical as well as longitudinal directions, it is assured that the trim members 16 and 18 will be pressed tightly together at the miter joint even though there may be some warpage of the trim member. By locating the trim members from their front faces, it is assured that the mitered joint will be flush at the faces even though the trim members may be of different thickness. This is not possible when the trim members are located from the backs thereof. The slot 150a in the plate 150 enables the operator to see the miter joint formed between the trim members 16 and 18. When the trim members 16 and 18 have been clamped in the position shown in FIG. 20, they are now ready to have the mitered joint secured together.

As previously mentioned in connection with FIG. 4, the corner clamping assembly 30 is provided with a tool guide 30a and assembly 31 is provided with a tool guide 31a. The universal corner clamping assembly 30' includes both tool guides 30a and 31a. This is best seen in FIG.

20. The tool guide 30a for right-hand trim corners is adapted to receive a suitable tool for drilling a screw opening and also providing a countersink for the head of the screw. Such tools are well-known in the art and have not been illustrated here. After the countersink has been made in the edge of the head trim member 18, FIGS. 20 and 22, a screw S is inserted through the tool guide 30a and into the head trim 18 and thence into the side trim 16 to secure the mitered ends of the trim members into a perfect mitered joint.

The mitered joint formed by the opposite end of the head trim member 18 and the left-hand side trim member 17 is clamped with a corner clamping assembly having a tool guide 31a such as the corner clamping assembly 31, FIG. 4, or assembly 30′, FIG. 20, and a screw inserted in a manner as previously described in connection with the right-hand trim corner. After the screws S have been inserted into the right-hand and left-hand corners of the trim assembly, it is possible to remove the trim assembly from the door jamb without disturbing the mitered joints. For example, where the jambs are of one piece as shown herein, it is necessary to remove the trim assembly from one side of the jambs in order to insert the jamb and door assembly into a rough frame opening in a building. In order that the trim assembly will be returned to its proper position on the edge of the door frame, it is desirable to drill small locating holes through the side trim members 16 and 17 and into the edges of the side jambs. These locating holes may be positioned at three or more spaced locations along each side jamb and when the trim assembly is to be replaced on the door jamb after it has been assembled in the rough frame opening, locating pins are adapted to be inserted through the locating holes in the trim assembly and into the corresponding locating holes in the edges of the jambs. Where split jambs are utilized, it is, of course, not necessary to remove the trim from either side of the jambs as the jambs separate in the middle, as disclosed in the aforementioned patents, permitting assembly thereof in a rough frame opening.

Referring to FIGS. 24–28, there is illustrated a modification of the invention adapted particularly for cutting miters on window trim in quantity. It is frequently desirable in mill work shops to pre-cut window trim members to standard lengths as required for standard size windows. The pre-cut trim is then delivered to the job site and installed on the windows in the buildings. This eliminates the need for the carpenter to cut the window trim at the job site thus saving installation time and avoiding errors in measurement that might be made on the job. The basic concept of compensating for the thickness of the saw blade during the cutting of the miters is utilized in the modification illustrated in FIGS. 24–28.

Figure 24:
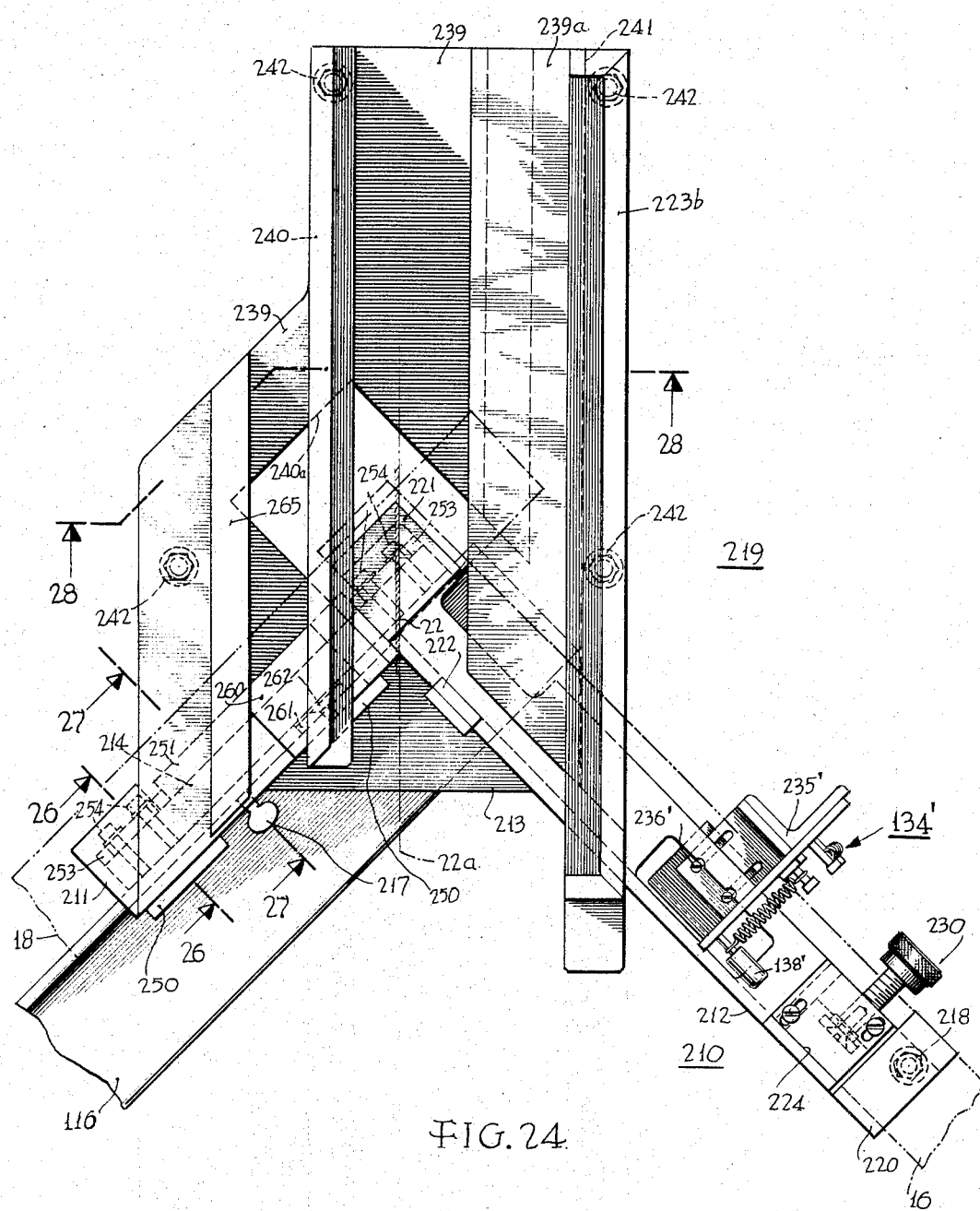
FIG. 24 is a top plan view of a right-hand trim support assembly and associated right-hand corner cutting jig assembly.

Referring to FIG. 24, it will be seen that the apparatus disclosed therein is similar in many respects to that disclosed in FIG. 16. For example, there is an L-shaped trim support assembly 210 which is generally similar to the support assembly 110 of FIG. 16, the principal differences being that there has been omitted from the support assembly 210 the structure corresponding to door jambs as the apparatus in FIG. 24 is primarily designed for cutting trim members for windows.

It will be apparent that the apparatus disclosed in FIG. 24 is adapted for cutting the trim members for a right-hand corner and the right-hand jig assembly 219 is generally similar to the right-hand jig assembly 19 previously described except that there is omitted from the jig assembly 219 the assemblies for clamping the door jamb and for clamping the head trim. The trim support assembly 210 comprises a pair of angle members 211 and 212 joined together at one of their ends to form a right angle. The right angle member 211 is provided with a lock 214 which cooperates with the vertical depending section 211a of the right angle member 211 to receive therebetween the vertical section 116a of the right angle iron 116, FIGS. 26 and 27. As in the case of the previous modification, the right angle iron 116 has a length greater than the width of any of the windows for which trim is to be cut. The angle member 116 in cooperation with a leg 218, FIGS. 24 and 25, is adapted to support the assembly 210 in a horizontal position. As may be seen in FIGS. 24 and 27, a thumb screw 217 extends through the section 211a of angle member 211 and clamps the latter to the angle iron 116. To maintain the sections 211 and 212 in a right angle position, there is provided a corner brace 213. While a right-hand support assembly 210 has been illustrated in FIGS. 24–28, it is to be understood that in practice there will be utilized a corresponding left-hand support assembly 310, FIG. 30, of similar construction and secured to the right angle member 116, FIG. 40, at a location spaced from member 212 by a distance corresponding to the width of the window for which the trim is being cut.

The right-hand side trim members are adapted to be supported in a horizontal position on a pair of horizontal blocks 220 and 221 carried by the upper surface of member 212, FIG. 24. The forward edge of the side trim member is adapted to be positioned against a pair of vertical locating blocks 222 and 224 also carried by the horizontal surface of member 212. The blocks 222 and 224 are adjustable horizontally relative to the vertical section of member 212 to provide any amount of offset for the window trim as desired. The locating block 222 may be adjustable by means of shims whereas the locating block 224 has been illustrated as a right angle section with the horizontal section thereof being provided with slots through which screws extend into member 212. The side trim members are adapted to be held against the locating blocks 222 and 224 and the horizontal supporting members 221 and 220 by means of a trim clamp 134′ which has been illustrated as of similar construction to the trim clamp 134 shown in FIG. 19 and for purposes of clarity, the parts thereof have been identified with corresponding reference characters. The principal difference in the two clamps is that the support plate 235 for clamp 134′ is adjustable transversely of member 212 as may be seen in FIG. 24. The support assembly 210 is also provided with a clamp 230 of similar construction to the clamp 130 shown in FIG. 16 for supporting a gauge to locate the lower end of the side trim members during a miter cutting operation. The details of the clamp 230 are the same as those illustrated in FIG. 16 and thus the description will not be repeated here.

As may be seen in FIGS. 24 and 28, the jig assembly 219 comprises a stationary frame having a bottom 239 including a raised section 239a which is supported by four legs 242, FIG. 24. The legs 242 are adjustable as to height as previously described in connection with FIG. 8. The bottom 239 including its raised section 239a supports two vertical members 240 and 241 which in turn support a pair of spaced tracks 223a and 223b along which is adapted to slide the carriage 24 of the saw 21 shown in FIG. 3. The tracks 223a and 223b are so positioned that the saw blade 22 of the saw will have the same angular position with respect to the trim members as previously described and illustrated in connection with FIGS. 5 and 5a.

As may be seen in FIGS. 24, 25 and 26, the jig assembly 219 is provided with a pair of locating members 250 which are connected to the edge of the bottom member 239 and depend therefrom for engagement with the vertical section 211a of member 211 as shown in FIG. 26. Secured to the underside of the bottom member 239 is a block 251 which is adapted to be received between a pair of spaced locating blocks 253 adjustably secured by screws 254 to the rear of block 214, FIGS. 24–26. The locating blocks 253 are provided with slots which extend lengthwise of the blocks and thus permit the blocks to be adjusted relative to the screws 254. The upper surface of the bottom member 239 is provided with a support 260 which extends vertically above the bottom member 239 and carries a locating surface 261. The locating surface 261 is secured to member 260 by a screw 262. The position of the locating surface 261 relative to its support 260 may be adjusted by the addition of shims to compensate for the thickness of the saw blade utilized in cutting the miters on the ends of the trim members. The thickness of the shims is determined in the same manner as previously described in connection with FIGS. 5 and 5a to determine the additional amount that the head trim member needs to be offset to compensate for the thickness of the saw blade. Thus, it will be apparent that the member 260 corresponds to the locating members 222 and 224 in FIG. 24 and that the thickness of member 261 corresponds to the additional amount of offset of the head trim required to compensate for the thickness of the saw blade.

As previously described, the locating members 222 and 224 are adjustable to provide a variation in the setback of the side trim for the window. The locating surface 261 likewise is adjustable by the use of shims to vary the amount of setback of the head trim member and also to compensate for the thickness of the cutting blade. Where the setback is to be varied, it is also necessary to adjust the jig assembly 219 lengthwise of member 211 of the support assembly 210. This is accomplished by adjusting the locating blocks 253 lengthwise of member 211 which in turn will adjust the position that member 251 will have with respect to member 211. As member 251 is secured to the bottom 239 of assembly 219, this will cause the assembly 219 to assume the adjusted position with respect to the support assembly 210.

In cutting the trim members with the apparatus illustrated in FIG. 24, the side trim member will rest on the horizontal supports 220 and 221 with the forward edge of the member against the locating members 222 and 224 as previously described. The head trim member is adapted to extend under the track 223a in front of the forward end 240a of member 240, FIG. 24. The lower surface of the head trim member will rest on the raised section 239a of the bottom of the frame and it will also rest on the top of the elongated block 265 which has its upper horizontal surface in the same parallel plane as the raised bottom section 239a, FIG. 28.

As may be seen in FIG. 24, the forward end of the left-hand track 223a is supported on the top of member 250. The rear of the track 223a is supported by the vertical member 240 as shown in FIG. 28. Since the spacing between the end 240a of member 240 and the front end of the track 223a is substantial, it is possible to insert trim members or jambs through that opening and have them rest on the top of member 265 and the raised bottom section 239a. By pressing the end of the trim members or jamb members against the vertical support 241, FIG. 28, it will be seen that the saw blade as it moves along its path in FIG. 24 will cut off such members at right angles rather than on a 45° miter.

Referring to FIGS. 29–39, it will be apparent that the apparatus disclosed therein is utilized in the same modification as the apparatus illustrated in FIGS. 24–28, the apparatus illustrated in FIGS. 29–39 being adapted for cutting the trim members for a left-hand corner. The left-hand jig assembly 320, FIGS. 29 and 31, is generally similar to the left-hand jig assembly 20 previously described except that there is omitted from the jig assembly 320 the assembly for clamping the door jamb. The left-hand jig assembly 320 is adapted to be supported on a left-hand trim support assembly 310, FIGS. 30 and 31. The left-hand trim support assembly 310 comprises a pair of angle members 311 and 312 joined together at one of their ends to form a right angle. The right angle member 311 is provided with a block 314 which cooperates with the vertical depending section 311a of the right angle member 311 to receive therebetween the vertical section 116a of the right angle iron 116, FIGS. 30–32 and 35–37 and 40. As may be seen in FIGS. 31 and 32, a thumb screw 317 extends through the section 311a of angle member 311 and clamps the latter to the angle iron 116. The sections 311 and 312 are maintained in a right angle position by means of a corner brace 313, FIG. 30.

The left-hand side trim members are adapted to be supported in a horizontal position on a pair of horizontal blocks 318 and 321 carried by the upper surface of member 312, FIG. 30. The forward edge of the side trim member is adapted to be positioned against a pair of vertical locating members 322 and 324 also carried by member 312. The locating member 324 is carried by the vertical section of member 318 and is adapted to be adjusted by means of shims. The locating member 322 is provided with slots 322a in its horizontal section through which extend screws 322b to provide adjustment for the locating member 322 with respect to the face 312a of member 312. The foregoing adjustments for members 324 and 322 provide any amount of offset for the window trim as desired. The left-hand side trim members are adapted to be held against the locating blocks or members 322 and 324 and the horizontal supporting members 321 and 318 by means of a left-hand trim clamp 134″ which has been illustrated as of similar construction to the right-hand trim clamp 134 shown in FIG. 19 and trim clamp 134′, FIG. 24 and for purposes of clarity, the parts thereof have been identified with similar reference characters.

Figure 38:
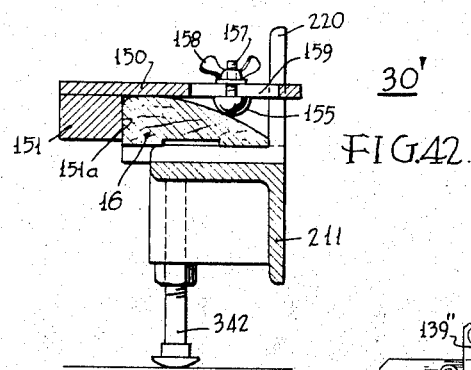
FIGS. 38 and 38a are vertical sectional views taken along the lines 38—38 in FIG. 31.
Figure 38A:
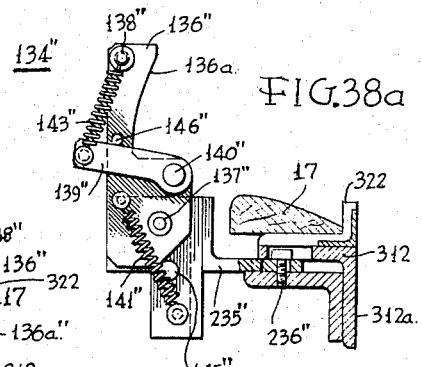

The trim clamp 134″ is best seen in FIGS. 38 and 38a. The supporting plate 235″ is provided with a pair of slots through which extend screws 236″ which permit the clamp 134″ to be adjusted transversely of the member 312. In FIG. 38 the various parts of the trim clamp 134″ are shown in clamping position. The arm 136″ is pivoted to the supporting plate 235″ at pivot 137″. The arm 136″ has a curved surface 136a″ which is adapted to engage the upper face of the side trim member 17. A second arm 139″ is pivoted at 140″ to arm 136″. The arm 139″ is provided with a forward edge 139a″ which is adapted to engage the rear edge of the trim member 17 as shown in FIG. 38. A spring 141″ is pinned to the supporting plate 235″ and to the arm 136″ and a second spring 143″ is pinned to the outer end of arm 136″ and to the outer end of arm 139″. The springs 141″ and 143″ are positioned so as to apply a downward force on the face of the trim member 17 to hold the back of the trim member 17 against the supports 321 and 318, FIG. 30, and to apply a force to the rear edge of the trim member 17 so as to hold the front edge against the locating members 322 and 324.

When the side trim clamp 134″ is moved to open position as shown in FIG. 38a, the arm 136″ is pivoted to a substantially vertical position with the lower end thereof resting on a stop pin 145″ carried by the supporting plate 235″. During movement of the lever arm 136″ to the position shown in FIG. 38a, the pin 146″, carried by lever arm 136″, will engage the forward edge 139a″ of lever arm 139″ and move it to the position shown in FIG. 38a. It will be seen that this is an over-center position with respect to the pivot 137″ and thus the spring 141″ will hold the clamp 134″ in the open position until it is closed by an operator. The side trim clamp 134″ may be provided with a handle 138″ to be grasped by the operator in opening and closing the clamp 134″. From the foregoing description, it will be seen that the clamp 134″ is of similar construction and is operated in similar manner to the side trim clamps 134 and 134′ previously described in connection with FIGS. 19 and 24. The support assembly 310 is also provided with a clamp 330 of similar construction to the clamp 130 shown in FIG. 16 for supporting a gauge to locate the lower end of the side trim members during a miter cutting operation. The details of the clamp 330 are the same as those illustrated in FIG. 16 and thus the description will not be repeated here.

As may seen in FIGS. 29, 31 and 34, the jig assembly 320 comprises a stationary frame having a bottom 339 including a raised section 339a which is supported by legs 342. The legs 342 are adjustable as to height as previously described. The bottom 339 supports vertical members 340–341 which in turn support a pair of spaced tracks 323a and 323b along which is adapted to slide a carriage 24 of the saw 21′ shown in FIG. 3. The tracks 323a and 323b, FIG. 31, are so positioned that the saw blade 22′ of the saw will have the same angular position with respect to the trim members as previously described and illustrated in connection with FIG. 13.

As may be seen in FIGS. 29 and 31, the jig assembly 320 is provided with a pair of locating members 350 and 350a which are connected to the edge of the bottom member 339 and depend therefrom for engagement with the vertical section 311a of member 311 as shown in FIGS. 35 and 37. Secured to the underside of the bottom member 339 is a block 351, FIG. 33, which is adapted to be received between a pair of spaced locating blocks 353 adjustably secured by screws 354 to the rear of the block 314, FIG. 33. The locating blocks 353 are provided with slots, not shown, which extend lengthwise of the blocks and thus permit the blocks to be adjusted relative to the screws. The upper surface of the bottom member 339 is provided with a pair of right angle support members 360, FIGS. 35 and 37, which include a vertical section carrying a locating surface 360a against which the edge of the head trim is positioned. The bottom of the head trim rests on a pair of locating blocks 361 and 362, FIG. 31, which have their upper surfaces in a common horizontal plane. The right angle members 360 are provided with slots through which extend screws 363, FIGS. 35 and 37, so that the vertical locating surfaces 360a may be adjusted relative to the face 311a of member 311 to provide the required setback of the trim and also to compensate for the thickness of the saw blade utilized in cutting the miters on the ends of the trim members. This setback is determined in a similar manner as previously described in connection with FIGS. 5 and 5a to determine the additional amount that the head trim member 18 needs to be offset to compensate for the thickness of the saw blade 22′.

As previously described, the locating members 322 and 324 are adjustable to provide a variation in the setback of the side trim 17 for the window. The locating surfaces 360a likewise are adjustable to vary the amount of setback of the head trim member and also to compensate for the thickness of the cutting blade. Where the setback is to be varied, it is also necessary to adjust the jig assembly 320 lengthwise of support member 311 of assembly 310. This is accomplished by adjusting the locating blocks 353, FIG. 33, lengthwise of member 311 which in turn will adjust the position that member 351 will have with respect to member 311. As member 351 is secured to the bottom of member 339 of assembly 320, this will cause the jig assembly 320 to assume the adjusted position with respect to the support assembly 310.

In cutting the trim members with the apparatus illustrated in FIG. 31, the side trim member 17 will rest on the horizontal supports 318 and 321 with the forward edge of the trim member 17 against the locating members 322 and 324 as previously described. The head trim member 18 is adapted to extend under the track 323a. The lower surface of the head trim member 18 will rest on the horizontal supports 361 and 362, FIG. 31, with the forward edge of the head trim member 18 against the locating surfaces 360a of members 360, FIGS. 35 and 37.

Figure 39:
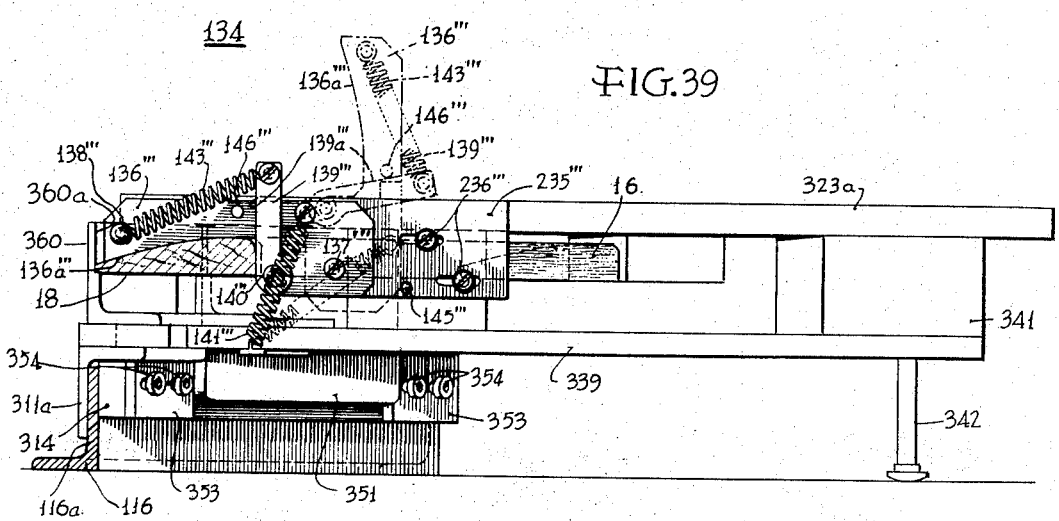
FIG. 39 is a side elevational view taken along the plane 39—39 in FIG. 31.

As may be seen in FIG. 31, the jig assembly 320 is also adapted to cut miters on stop members and is also provided with a clamp 134‴ for holding the head trim. The trim clamp 134‴ is best shown in FIG. 39 and it will be apparent that the clamp 134‴ is similar in construction to the other trim clamps 134, 134′ and 134″ previously described. The clamp 134‴ is carried by a supporting plate 235‴ which is provided with horizontal slots through which screws 236‴ extend. The screws 236‴ secure the plate 235‴ to the forward support block 341. The clamp 134‴ includes a main lever arm 136‴ which is pivoted at 137‴ to the plate 235‴. A second lever arm 139‴ is pivoted to the lever arm 136‴ at pivot 140‴. A spring 141‴ is connected to the lever arm 136‴ and to a fixed support carried by the bottom member 339 to bias the lever arm 136‴ in a downward position. A second spring 143‴ interconnects the outer ends of lever arms 136‴ and 139‴. As may be seen in FIG. 39, the lever arm 136‴ is provided with a curved surface 136a‴ which is adapted to engage the face of the head trim 18 and the lever arm 139‴ is provided with a forward edge 139a‴ which is adapted to engage the rear of the head trim member 18. The spring 143‴ biases the leading edge 139a‴ of lever arm 139 against the rear edge of the head trim 18 while the spring 141‴ biases the surface 136a‴ against the face of the head trim 18. When the clamp 134‴ is moved to open or unclamped position, the parts thereof assume the positions illustrated by the phantom lines in FIG. 39. In the open position, the lever arm 136‴ is adapted to engage a stop such as member 145‴ carried by the supporting plate 235‴.

As pointed out above, the jig assembly 320 of FIG. 31 also is adapted to cut miters on stop members. A side stop member is adapted to be supported by a pair of L-shaped brackets 367 which in turn are carried by a right angle member 368 supported from the top of the bottom member 39a, FIGS. 29, 31 and 32. The L-shaped bracket members 367 are provided with curved spring members 369 which are adapted to force the side stop against the vertical section of the right angle member 368. The head stop member is adapted to be supported by an L-shaped bracket 370 which is adjustably carried on the upper surface of bottom member 339 by means of screws 371 which extend through slots in the horizontal section of the bracket 370, FIGS. 29, 31 and 36. The bracket 370 is provided with a pair of springs 372 which are adapted to bias the head stop against the vertical surface of a right angle member 374, the horizontal section of which is adjustably secured to the upper surface of bottom member 339 by means of screws 375 which extend through slots in member 374, FIG. 36. With the arrangement as shown in FIGS. 29, 31 and 35–37, it will be seen that the locating members 360 for the head trim 18 and the locating member 374 for the head stop member may be adjusted independently of each other relative to the jamb surface 311a on member 311. This construction provides for greater flexibility in adjusting the jig assembly 320 both during manufacture and during operation. Such adjustments are particularly desirable as adjustment of one part will not disturb adjustment of the other. It, of course, will be recalled that these are the locating surfaces which are adjusted to compensate for the thickness of the saw blade.

Referring to FIG. 40, it will be seen that the support assemblies 210 and 310 have been positioned on the angle iron 116 in the manner previously described in detail and the left-hand jig assembly 320 and the right-hand jig assembly 219 have been positioned adjacent the respective support assemblies 310 and 210 preparatory to being mounted thereon for a miter cutting operation. The side trim members 16 and 17 are clamped in position by means of trim clamps 134′ and 134″. The lower ends of the side trim members are located by means of gauge sticks 300 which extend into the gauge clamps 230 and 330, FIG. 40. The gauge sticks 300 support at their outer ends gauge members 301 which comprise a saddle which is adapted to ride on the gauge sticks 300 and the saddle has an upstanding shoulder 302 against which the outer ends of the side trim members 16 and 17 engage. The gauge members 301 are adjustably secured to the gauge sticks 300 by means of thumb screws 303, FIGS. 40 and 51. The gauge sticks 300 preferably are provided with a scale 304 for use in adjusting the gauge members 301 to the desired position for the required length of trim members.

Figure 42:
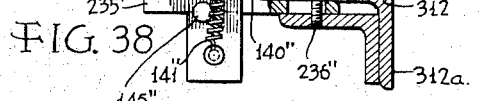
FIG. 42 is a vertical sectional view taken along the plane 42—42 in FIG. 41.
Figure 43:
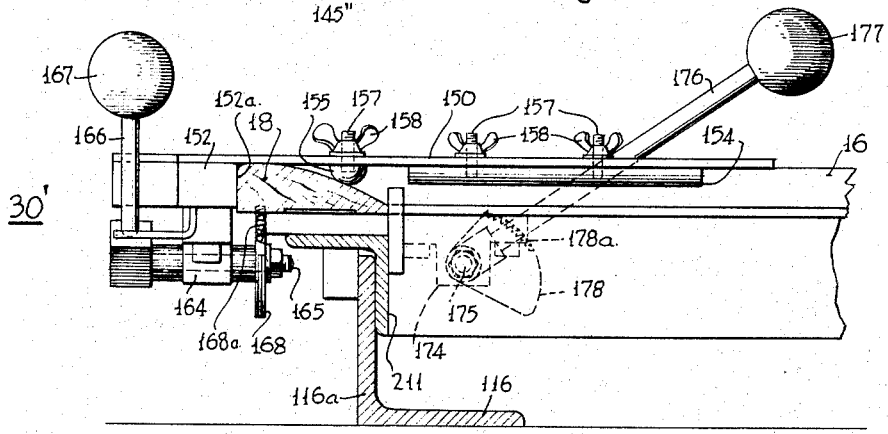
FIG. 43 is a vertical sectional view taken along the plane 43—43 in FIG. 41.

After the cutting operation has been completed, the jig assemblies 219 and 320 are removed from the support assemblies 210 and 310 and the latter remain in place on the angle iron 116 preparatory to the application of the corner clamps 30' in the manner shown in FIGS. 41-43. As may be seen in FIG. 40, the block 380 has its upper surface in the same horizontal plane as the upper surface of member 321 and thus these members cooperate to support the head trim member 18 along with members 221 and 211 of the support assembly 210. With the side trim members 16 and 17 clamped in position as shown in FIG. 40 by means of clamps 134' and 134'', the head trim member 18 is adapted to be clamped in position by means of the miter clamps 30' as shown in FIG. 41. The knobs 167 and 177 on the corner clamp 30' are rotated upwardly to move the cams 168 and 178 against the bottom surfaces, respectively, of the head trim member 18 and the side trim member 16 as previously described in detail in connection with FIGS. 20-23. The cams 168 and 178 are provided with teeth 168a and 178a, respectively, to aid in gripping the bottom faces of the trim members to move the latter relative to the top plate 150. With the trim members clamped together at their mitered ends as shown in FIG. 41, screws are then adapted to be inserted into the head trim in manner previously described in connection with FIGS. 4, 20 and 22.

Referring to FIGS. 44 and 45, there is shown a further modification of the invention which is identical with the modification illustrated in FIG. 31 with the exception that the trim clamping assembly 134''' has been removed from the jig assembly 320' and a trim clamp 134' has been added to the support assembly 310'. As may be seen in FIGS. 44 and 45, the member 311 has been lengthened to provide a support for the trim clamp 134' and also for the gauge clamp 230, both of the latter being identical in construction to the corresponding parts shown in FIG. 24. Since the other parts of the modification shown in FIGS. 44 and 45 are identical with the modification shown in FIG. 31, such parts have been supplied with the same reference characters for clarity and it is not believed necessary to repeat a detailed description of them. The modification shown in FIGS. 44 and 45 may be utilized in the same manner as the modification shown in FIG. 31.

The modification shown in FIGS. 44 and 45 is particularly applicable for use as a carpenter's miter box for an electric saw as both left-hand and right-hand mitered corners can be cut and assembled with the jig assembly 320' shown in FIG. 44. To use the jig shown in FIG. 44, a left side trim member 17 and a top trim member 18 are assembled in the same manner as previously described with the jig assembly 320 shown in FIG. 31 with the desired setback. A miter is cut on the corresponding ends of the left side trim member 17 and the top trim member 18. The gauge stick 300 which is inserted in the clamp 330 is adjusted so that the left side trim member 17 has the required length. No further cutting is necessary after this one cutting operation on the left trim member 17. The left trim member 17 is then removed from the jig assembly 320' and the head trim member 18 is inserted in its place with the mitered end adjacent the clamp 330 and the straight end extending beneath the saw blade 22'. The gauge stick 300, which is inserted in the clamp 330 is provided with scale markings corresponding to the desired width of the head trim member. It will be recalled that the saw blade 22' is positioned to the right of the line 22a' which bisects the right angle formed between the members 311 and 312. Thus, when the head trim member was cut off on its left-hand end during the previous cutting operation, it was cut short by an amount corresponding to the thickness of the saw blade 22'. However, this does not present a problem as the opposite miter has not yet been cut. When the position of the head trim is determined for cutting the opposite miter thereon, the measurement is made from the member 350 which has a thickness corresponding to the setback of the trim from the face of one of the jambs. Thus, the inner edge of the head trim member 18 will have a length longer than the width of the jamb opening which it is to trim by an amount equal to twice the desired setback. The length of the stop members is gauged from the surface 311a as the stop members are installed directly on the faces of the jambs and do not have a setback as in the case of the trim members.

After the head trim member 18 has been positioned on the jig assembly 320' preparatory to cutting off the opposite end thereof, the right side trim member 16 is positioned on the supports carried by the member 311. A gauge stick 300 and gauge 301 are carried by the clamp 230 and the markings on the gauge stick 300 correspond to the length of the right side trim member. Since, during this cutting operation the right side trim member will be cut short by an amount corresponding to the thickness of the saw blade 22', it is necessary to increase the over-all length of the right side trim member by a corresponding amount.

After the trim members have been cut with the appropriate miters by the jig assembly 320' as shown in FIG. 44, the jig assembly 320' is removed from its support assembly 310' as shown in FIG. 45. The trim members may be positioned on the support assembly 310' of FIG. 45 in the same manner as shown in FIG. 40. First, one corner may be assembled by means of a corner clamping assembly 30' as shown in FIGS. 41-43 and then the other corner of the trim may be assembled. The screws are inserted in the top trim member in the same manner as previously described in detail in connection with FIGS. 4, 20-23 and 41.

From the foregoing, it will be seen that with the modification shown in FIGS. 44 and 45, the trim members and the stop members may be cut for doors and windows including the necessary compensation for the thickness of the cutting blade 22'. This is the same method utilized in the previous modifications with the exception that it is necessary to turn the head trim member end-for-end during the second miter cutting operation. This operation is somewhat more time consuming than the arrangement illustrated in the previous modifications but in some instances it may be preferred as it requires only one jig assembly. Where trim is to be cut in quantity as for a quantity of windows or for a quantity of pre-cut doors and jambs, the previous modifications utilizing separate jig assemblies for the right-hand and left-hand corners would be preferable. It is, of course, to be understood that the jig assembly 320' in FIG. 44 would utilize the saw 21' as shown in FIG. 3 and also as to be used with the jig assembly 320 illustrated in FIGS. 31 and 40.

The jig assemblies 320 and 320' of FIGS. 31 and 44, respectively, are also adapted to cut head trim to the desired length in the same manner as now to be described in connection with the left-hand jig assembly 20 illustrated in FIG. 13. As previously pointed out in connection with FIG. 13, the raised bottom member 39a' is adapted to support a jamb member. Such an arrangement is shown in FIG. 47 where a head jamb 10 is supported on the member 39a' and beneath the track 23b' which supports the carriage 24' which in turn carries the saw 21'.

Before the head jamb 10 is inserted in the position shown in FIG. 47, the width of the door is gauged by means of a gauge 400, FIG. 46. The gauge 400 comprises a rod 401 having a shoulder 402 secured to one end thereof and having at the opposite end a slidable member 403 which is adjustably secured to the rod 401 by means of a thumb screw 405. The adjustable member 403 has secured to the lower end thereof a pad 406 and a plurality of shims 407 by means of a screw 408. The gauge 400 is positioned on the door in the manner shown in FIG. 46 with the shoulder 402 engaging one edge of the door and the pad 406 engaging the opposite edge of the door. Thus, the spacing between members 402 and 406 corresponds to the exact width of the door 13. The head jamb 10 must have an over-all length corresponding to the width of the door 13 plus the desired clearance on each side of the door plus the depth of the dado in each of the side jambs. The overall width of the member 403 plus the shim washers 407 and the pad 406 correspond to the total dimension of the desired depth of dado plus the door clearance for both sides of the door. Thus, when the gauge 400 is used to hand cut a perfect door jam, the shoulder 402 is placed over one end of the head jamb and the outer edge 403a of member 403 is used to align the hand saw for cutting the head jamb.

In cutting head jambs on the corner cutting assembly 20 as shown in FIG. 47, the shoulder 402 on gauge 400 is moved into engagement with a locating member 409, FIGS. 46–49, carried by the raised bottom member 39a'. The outer surface of member 409 is positioned by means of spacers so that it is spaced from the adjacent edge of the saw blade 22' a distance Y, FIG. 46, corresponding exactly to the thickness Y of the member 403 of gauge 400. The gauge 400 is adapted to be inserted in the jig assembly 20 in the manner shown in FIGS. 47 and 48 with the rod 401 positioned beneath the locating members 40b', FIG. 50, and with the member 402 engaging member 409, FIG. 49. A pivoted lock member 410 is provided, as shown in FIGS. 13 and 48, for locking the rod 401 in place. The head jamb 10 is then positioned with its outer end against the surface 403b of gauge 400 and the opposite end of the head jamb member will extend beyond the path of the saw blade 22'. The saw blade 22' will cut off the end of the head jamb 10 as shown in FIGS. 46 and 47 so that the head jam 10 will have the perfect length required; namely, a length equal to the width of the door plus the width of both dadoes and the clearance at each side of the door.

While the head jamb gauge 400 has been described in connection with the use thereof in left-hand jig assembly 20 of FIG. 13, it is also to be understood that it is utilized in the same manner in the jig assembly 320 of FIGS. 29 and 30 and jig assembly 320' of FIG. 44. Both of these jig assemblies 320 and 320' are provided with a support block 340a' which supports the forward end of track 323b and which also supports a pair of locating blocks 340b' beneath which the rod 401 of gauge 400 is adapted to be positioned. Both of the jig assemblies 320 and 320' are provided with a locating member 409' which is similar to member 409 shown in the jig assembly 20 in FIGS. 13 and 47.

As previously described in connection with FIG. 40, the support assemblies 210 and 310 are positioned on the angle iron 116 with the spacing between the faces 212a and 312a corresponding to the spacing between the jambs for the door or window for which the trim is to be cut. The right-hand support assembly 210 is maintained in fixed position regardless of the width of the door or window for which the trim is to be cut. The left-hand support assembly 310 is adjusted relative to the right-hand support assembly 210 for the different sizes of windows or doors. To facilitate such adjustment, the angle iron 116 is provided with a plurality of locating gauges 390 which are adapted to be positioned at locations corresponding to standard width doors and windows. For example, the standard width openings would be 18", 24", 28", 32" and 36". The locating gauges 390 comprise a body member 391 which is shaped similar to a C-clamp and has a thumb screw 392 extending through the bottom thereof which is adapted to be tightened against the horizontal flange 116b of the angle iron 116 as shown in FIG. 52. The body 391 is bifurcated at the top thereof and carries on a pin 393 a pivoted finger 394 which is adapted to be received in a notch 395a in block 395 carried by member 311 of support assembly 310, FIG. 30. The notch 395a is in the lower edge of block 395 and is adapted to receive the pivoted locating finger 394 when the support assembly 310 is positioned on the vertical section 116a of angle iron 116. The finger 394 has a hole therethrough near its outer end as shown in FIG. 52 through which extends a locking pin 396, the lower end of which is adapted to extend into a hole in the horizontal section 116b of angle iron 116. The hole through section 116b is positioned at one of the standard locations corresponding to a standard width door or window. The thumb screw 392 provides additional locking means for the locating gauges 390 and also is used when the gauges 390 are positioned along the angle iron 116 for windows and doors which are not of standard size.

The vertical section 116a of the right angle member 116 preferably is provided with a series of conical walled openings 116c as shown in FIG. 40. The openings 116c are adapted to receive the conical end of thumb screw 217. The openings 116c may be positioned at standard locations and thus provide an alternative arrangement for quickly locating the left-hand end support assembly 310 for standard width doors and windows. The locating gauges 390, FIGS. 30, 40, 52 and 53, are preferably used for locating the support 310 for doors and windows which are not of standard size. Under such circumstances, the thumb screw 392 provides the locking action for locking the gauge 390 to the angle iron 116 as the pin 396 may not be in alignment with any of the holes 116d in section 116c of angle iron 116.

To assist the operator in cutting the head trim member and the head stop member with the jig assembly 320' shown in FIG. 44, gauge stick 300 in clamp 330 may be provided with a special locating gauge 500 such as shown in FIG. 54. The locating gauge 500 is adapted to be supported on the gauge stick 300 in a manner similar to the gauge members 301 shown in FIG. 51. The locating gauge 500 is adapted to engage the mitered left-hand end of the head trim and head stop members when they are positioned on the jig assembly 320', FIG. 44, preparatory to cutting the miters on the right-hand ends of the head trim and head stop members. It will be recalled that the jig assembly 320' in FIG. 44 is adapted for use as a carpenter's miter box and is capable of cutting the miters for both corners of the trim and stop members.

Referring to FIG. 54, it will be seen that the locating gauge 500 includes a plate 501 which is mounted on a saddle member 502 which is adapted to slide along the gauge stick 300 and be secured thereto at the desired location by means of a thumb screw 503. The plate 501 supports a locating block 504 by means of a pair of screws 505 which extend into a pair of slots 501a which are inclined at an angle of 45° with respect to the gauge stick 300. The block 504 is provided with a pair of surfaces 504a and 504b which are disposed at an angle of 45° with respect to each other, such angle corresponding to the miter previously cut on the left-hand end of the head trim member 18. These surfaces 504a and 504b, as shown in FIG. 54, are adapted to engage the mitered surface and the rear edge of the head trim member 18, respectively. The rear edge of the head trim member 18 is also adapted to be engaged by a spring 509 which is secured to a block 508 by means of a screw 510. The block 508 is mounted on the plate 501 by means of a pair of screws 511 which extend through a pair of parallel slots 501b. The slots 501b are at right angles to the axis of gauge stick 300 whereas the slots 501a are at an angle of 45° to the axis of gauge stick 300. This permits the locating blocks 504 and 508 to be adjusted relative to the mounting plate 501 to accommodate trim members of different widths as well as providing for different amounts of setback of the trim from the face of the jamb.

The mounting plate 501 is also provided with a locating block 506 which is secured thereto by means of a pair of screws 507. The block 506 has a mitered end 506a which is adapted to engage the mitered end of the head trim member 18. Thus, it will be seen that the inclined surfaces 504a of block 504 and 506a of block 506 are in line with each other and both are adapted to engage the mitered left-hand end of head trim member 18. The locating block 506 is threaded to receive one end of a screw member 515 which is adapted to extend through a locating member 513 and a plurality of shim washers 514. The outer surface 513a of locating member 513 corresponds to the side jamb line or face. The surface 506b of block 506 represents the inner edge of a trim member and the total thickness of member 513 and shim washers 514 represent the desired setback of the trim members with respect to the jamb face. Thus, where a ¼" setback for the trim is desired, the spacing between the surfaces 513a and 506b will be equal to ¼". This spacing is obtained by inserting the appropriate number of shims 514 between the locating plate 513 and the locating block 506. When the head trim member 18 is positioned on the gauge 500, it will be seen that the corner of the miter at the inner edge of the head trim member 18 is in alignment with the surface 506b and the inner edge of the head trim member 18 is in engagement with the end of member 513. The head stop 36 is adapted to be received between a pair of blocks 512 and the end of the head stop 36 engages the surface 513a of locating member 513.

When utilizing the locating gauge 500 as shown in FIG. 54, the carpenter measures the width of the jamb opening with a ruler and this dimension is then measured from the face 311a, FIG. 44, along the gauge stick 300 which is clamped in the clamp 330. The gauge 500, carried by stick 300, FIG. 54, is adjusted on stick 300 until the surface 513a of plate 513 is in alignment with a marking on scale 304 corresponding to the width of the jamb opening. The gauge 500 is then clamped in place on stick 300 by means of thumb screw 503. The plate 501 is provided with an opening 501c which permits the operator to view the scale 304 on stick 300, FIG. 54. With the locating gauge 500 in FIG. 54, the operator need not make his measurements from the block 350, FIG. 44, as described above to compensate for the setback of the trim as this compensation is now taken care of by means of the locating member 513 on gauge 500. The gauge 500 permits the operator to make a direct measurement of the width of the jamb opening and the head stop member 36 will have a length the same as the width of the jamb opening.

While the locating gauge 500 in FIG. 54 has been described specifically in regard to use with the jig assembly 320' shown in FIG. 44, it is to be understood that the gauge 500 may also be utilized with the jig assembly 320 and the support assembly 310 shown in FIG. 31 for cutting the miters on both ends of the head trim member and head stop member as described in connection with FIGS. 44 and 45.

The present invention has been described specifically in connection with cutting and assembling trim and stops for doors and windows. It will be apparent that various features of the present invention are also applicable to other types of trim members such, for example, as trim members utilized in the construction of picture frames and the like where it is important to have a perfect miter joint between adjacent trim members. In this connection, the use of the term trim members in the claims is considered in its generic sense to include such types of trim members whether they be for doors or windows or other types of frame assemblies constructed from trim members.

It shall be understood the invention is not limited to the specific arrangement shown and that changes and modifications may be made within the scope of the appended claims.

What is claimed is:

1. The method of cutting the trim members for doors and windows comprising the steps of:
supporting a pair of side trim members parallel to each other and in a common plane in the relative positions they will have in their normal installation,
supporting a head trim member in a plane parallel to the plane of the side trim members with the head trim member extending across the upper ends of the side trim members and being perpendicular thereto, the head trim member being positioned beyond its normal assembled head position with respect to the side trim members by a predetermined amount corresponding to the thickness of a cutting member, and
concurrently cutting miters on at least one end of the head trim member and the adjacent side trim member while the trim members are in their supported positions.

2. The method of cutting trim members for doors according to claim 1 wherein the side trim members are supported on side jamb members and secured thereto.

3. The method of cutting trim members for doors according to claim 1 wherein a pair of side door stop members are supported parallel to and adjacent the side trim members with the upper ends of the side door stop members extending beyond the path of the cutting member so that miters are cut on the side door stop members concurrently with the cutting of the miters on the adjacent ends of the head trim member and the side trim members while all of said members are in their supported positions.

4. The method of cutting the trim members for doors according to claim 1 wherein a head door stop member is supported in parallel relation to the head trim member and in a plane perpendicular thereto with the ends of the head door stop member extending beyond the path of the cutting member whereby miters are cut on the ends of the head door stop member concurrently with the cutting of the miters on the ends of the head trim member and the adjacent side trim members while all of the members are in their supported positions.

5. The method of cutting trim members according to claim 1 wherein the head trim member is moved into its normal assembled head position with respect to its side trim members after the miters have been cut on the trim members clamping the adjacent mitered ends of the trim members in tight engagement and securing the clamped mitered ends together to form a close fitting mitered joint.

6. The method of cutting trim members according to claim 5 wherein the adjacent mitered ends of the head trim member and side trim members are clamped in assembled relation by applying a force to the rear of the trim members to force the front face of the trim members against a fixed support, the force applied to the rear of the trim members also acting in a direction lengthwise of the trim members toward the adjacent mitered ends thereof.

7. The method of clamping together the adjacent mitered ends of trim members to form a close fitting mitered joint comprising the steps of:
moving the front faces of the trim members against a fixed support with the mitered ends of the trim members in approximately their normal assembled relation, and
applying a force to the rear of the trim members, the latter force acting in a direction perpendicular to the fixed support and lengthwise of the respective trim members in the direction of the mitered ends.

8. The method of trimming a door comprising:
supporting a door in a door frame including a pair of side jambs and a head jamb,
locating a pair of side trim members with respect to the front face of the respective side jambs to provide the desired setback of the trim with the upper ends of the side trim members extending beyond the head jamb member,
securing the side trim members to the side jamb members in their located positions,
supporting a head trim member in a plane parallel to the plane of the side trim members with the head trim member extending across the upper ends of the side trim members and being perpendicular thereto, the head trim member being positioned behind the face of the head jamb member by a predetermined amount corresponding to the setback of the side trim members plus an amount corresponding to the thickness of a cutting member, concurrently cutting miters on at least one end of the head trim member and the adjacent side trim member while the trim members are in their supported positions, removing the head trim member from its supported position, and securing the mitered ends of the head trim member to the corresponding mitered ends of the side trim members.

9. The method of cutting the trim members for doors and windows comprising the steps of:

supporting at least one side trim member in a plane in the relative position it will have in normal installation, supporting a head trim member in a plane parallel to the plane of the side trim member with the head trim member extending across the upper end of the side trim member and at a right angle thereto, the head trim member being positioned beyond its normal assembled head position with respect to the side trim member by a predetermined amount corresponding to the thickness of a cutting member, and concurrently cutting a miter on at least one end of the head trim member and the adjacent side trim member while the trim members are in their supported positions.

10. The method of trimming a door according to claim 8 including the steps of turning the door and frame over and supporting it on the opposite end to which the trim members have been applied, and repeating the steps in claim 8 to apply trim strips to the opposite side of the door frame.

11. The method according to claim 8 wherein a head door stop member is supported in parallel relation to the head trim member and in a plane perpendicular thereto with the ends of the head door stop member extending beyond the path of the cutting member, the head door stop member being positioned behind the face of the head jamb member by a predetermined amount as determined by the thickness of the cutting member whereby miters are cut on the ends of the head door stop member concurrently with the cutting of the miters on the ends of the head trim member and the adjacent side trim members while all of the members are in their supported positions.

12. The method of trimming a door according to claim 8 wherein a pair of side door stop members are supported parallel to and in the same planes as the front faces of the side jambs with the upper ends of the side door stop members extending beyond the path of the cutting member so that miters are cut on the side door stop members concurrently with the cutting of the miters on the adjacent ends of the head trim member and the side trim members while all of the said members are in their supported positions.

13. Apparatus for trimming a door comprising:

means for supporting a pair of side trim members in a common plane and parallel to each other in the relative positions they will have in their normal installation, means for supporting a head trim member in a plane parallel to the common plane of the side trim members with the head trim member extending across the upper ends of the side trim members and being perpendicular thereto, means for locating the head trim member beyond its normal assembled head position with respect to the side trim members by a predetermined amount corresponding to the thickness of a cutting member, means for clamping the adjacent overlapping ends of the head and side trim members in their supported positions, and means for guiding a cutting member along a predetermined path extending through said overlapping ends of said trim members so that one side of said cutting member forms an angle of 45° with respect to the edge of the side trim member and the other side of the cutting member forms an angle of 45° with the sides of the head trim member.

14. Apparatus for cutting trim for a door or window comprising:

means for supporting at least one side trim member in a plane in the relative position it will have in normal installation, means for supporting a head trim member in a plane parallel to the plane of the side trim member with the head trim member extending across the upper end of the side trim member and at a right angle thereto, means for locating the head trim member beyond its normal assembled head position with respect to the side trim member by a predetermined amount corresponding to the thickness of a cutting member, means for maintaining the adjacent overlapping ends of the head and side trim members in their supported positions, and means for guiding a cutting member along a predetermined path extending through the overlapping ends of the trim members and bisecting the right angle formed between the trim members.

15. Apparatus for cutting miters on adjacent trim members comprising:

means for supporting a first trim member in a first plane, means for supporting a second trim member in a second plane parallel to the first plane of the first trim member with the second trim member extending across an end of the first trim member and at a right angle thereto, means for locating the second trim member beyond its normal assembled position with respect to the first trim member by a predetermined amount corresponding to the thickness of a cutting member, and means for guiding a cutting member along a predetermined path which bisects the right angle formed by the trim members and extends through the overlapping ends of trim members so that miters are concurrently cut on both of the trim members.

16. The method of cutting trim members according to claim 9 wherein said predetermined amount is equal to the thickness of the cutting member multiplied by the square root of two.

17. A gauge for determining the setback of trim members for door frames and the like comprising:

a plate member, spacer means carried by said plate member at one end thereof, said spacer means having a thickness equal to the desired setback of the trim members, and means carried by said spacer means and adapted to grip the edge of the frame while said plate member is in engagement with the face of the frame.

18. A gauge according to claim 17 wherein said plate member has a thickness no greater than the clearance between the frame and the door therein.

19. A gauge according to claim 17 wherein said means for gripping the frame comprises:

at least one needle member, and means for adjusting the length of protrusion of said needle member beyond said spacer means to control the depth of penetration of said needle member into the edge of the frame.

20. A gauge according to claim 17 including handle means securing said plate member to said spacer means.

21. A gauge according to claim 19 including means for locking said needle member in adjusted position.

22. A gauge according to claim 17 wherein said gripping means comprises:

a pair of needle members extending from said spacer means in a direction toward the opposite end of said plate member.

23. Corner cutting apparatus comprising:
a frame,
means carried by said frame for supporting a pair of trim members in spaced parallel planes and at right angles to each other with adjacent ends of the trim members in overlapping relation,
means carried by said frame for clamping said trim members in right angle relation to each other,
means carried by said frame and extending over said overlapping ends of the trim members for guiding a cutting member along a path bisecting the right angle formed between the trim members, a slide carried by said frame, said slide having structure at one end thereof forming substantially a right angle and adapted to engage the corner of a jamb, and means for actuating said slide to clamp said apparatus to a door jamb.

24. Corner cutting apparatus according to claim 23 wherein said slide includes structure for engaging the rear of the lower one of the trim members to maintain the latter in a predetermined plane during movement of the cutting member along said path.

25. Apparatus for clamping a head trim member and side trim member in predetermined positions relative to a door frame comprising:
frame structure,
means carried by said frame structure for supporting a head trim member and a side trim member in spaced parallel planes and at right angles to each other with the adjacent ends of the trim members in overlapping relation,
slide structure carried by said frame structure, said slide structure having means at the forward end thereof adapted to engage the rear sides of a head jamb and side jamb of a door frame at a corner thereof,
means carried by said frame structure for engaging the front side of one of the jambs,
operating means carried by said frame structure for clamping said slide structure against the jambs to secure said apparatus thereto,
clamping structure carried by said slide structure for clamping the head trim member in fixed position relative to the side trim member,
means for manually operating said clamping structure into clamping position, and
means carried by said frame structure for automatically releasing said clamping structure from its clamping position upon movement of said slide structure to its unclamped position by said operating means.

26. Apparatus according to claim 25 including track structure carried by said frame structure for guiding a cutting member along a path bisecting the right angle formed between the trim members.

27. Apparatus according to claim 25 wherein said clamping structure comprises:
a first lever pivoted at the lower end thereof to said slide structure,
a second lever pivoted intermediate the ends thereof to said slide structure at a location spaced from said first lever,
a link interconnecting said first and second levers, said link having an elongated slot therein,
a fixed pin extending through said slot and carried by said slide structure,
a floating pin extending through said slot and into an elongated slot in said first lever,
cam structure carried by the lower edge of said link and extending beyond said floating pin for engagement with the face of the head trim member,
spring means interconnecting the outer end of said first lever and the end of said link having said cam structure, and
second spring means connected to the opposite end of said link and to said slide structure, both of said spring means cooperating to bias said cam structure and an edge of said first lever against the head trim member to hold the latter in clamped position.

28. Apparatus according to claim 27 wherein said means carried by said frame structure for automatically releasing said clamping structure from its clamping position includes roller structure engageable with said second lever at a location below its pivot to rotate said second lever in a reverse direction about its pivot.

29. Apparatus according to claim 26 wherein said frame structure includes a bottom having a raised section extending from one side thereof and locating means carried by said raised section and positioned at right angles to said track structure, said locating means supporting one end of said track structure and cooperating with said raised section supporting a jamb member thereon at right angles to the path of travel of the cutting member adapted to move along said track structure.

30. Apparatus according to claim 29 including structure carried by said locating means and by said raised section for positioning a gauge to determine the position of a head jamb relative to the path of the cutting member.

31. Apparatus for clamping a head trim member and side trim member in predetermined positions relative to a door frame comprising:
frame structure,
means carried by said frame structure for supporting a head trim member and a side trim member in spaced parallel planes and at right angles to each other with the adjacent ends of the trim members in overlapping relation,
slide structure carried by said frame structure, said slide structure having means at the forward end thereof adapted to engage the rear sides of a head jamb and side jamb of a door frame at a corner thereof,
means carried by said frame structure for engaging the front side of one of the jambs,
operating means carried by said frame structure for clamping said slide structure against the jambs to secure said apparatus thereto, and
clamping structure carried by said slide structure for clamping the head trim member in fixed position relative to the side trim member, said clamping structure being operable concurrently with said operating means.

32. Apparatus according to claim 31 wherein said clamping structure comprises:
a first lever pivoted at one end thereof to said slide structure, the opposite end of said first lever having cam structure adapted to engage the face of the head trim member,
a second lever pivoted at the lower end thereof to said slide structure, said second lever having cam structure at the upper end thereof adapted to engage the rear of the head trim member,
slot structure in the upper end of said second lever,
pin structure carried by said first lever and extending into said slot structure, and
spring means connected to said slide structure and to both of said levers for biasing said cam structures into engagement with the head trim member.

33. Apparatus for supporting trim members in right angle relationship preparatory to cutting miters on the adjacent ends thereof, characterized by the subcombination of a support assembly comprising:
a pair of elongated members connected at one of their ends to form a right angle structure,
means on one of said elongated members for securing said right angle structure to a support,
means on the other of said elongated members for supporting a trim member in a predetermined plane,
means on said other elongated member for locating the inner edge of the trim member at a predetermined distance behind the inner face of said other elongated member, said predetermined distance corresponding to the desired setback of the trim member with respect to a jamb, and clamping means carried by said other elongated member for clamping the trim member in fixed position thereon.

34. Apparatus according to claim 33 including means carried by said other elongated member for locating one end of the trim member relative thereto.

35. Apparatus for clamping a head trim member and side trim member at right angles to each other comprising:
  a right angle support assembly including a pair of elongated members joined together at one of their ends to form a right angle structure,
  means on one of said elongated members for clamping said support assembly to supporting structure,
  means on the other of said elongated members for supporting a side trim member in parallel relation thereto,
  a corner cutting assembly,
  means for clamping said corner cutting assembly to said support assembly at the junction of said elongated members,
  means on said corner cutting assembly and cooperating with said support assembly for supporting a head trim member and the side trim member in spaced parallel planes and at a right angle to each other with the adjacent ends of the trim members in overlapping relation, and
  means carried by said supporting assembly for clamping said side trim member in fixed position relative to said head trim member.

36. Apparatus according to claim 35 including clamping means carried by said corner cutting assembly for clamping the head trim member in fixed position relative to the side trim member.

37. Apparatus for clamping together the adjacent mitered ends of trim members to form a close fitting mitered joint comprising:
  a plate,
  a pair of blocks carried by said plate and having locating surfaces positioned at right angles to each other to engage the outer edges of a pair of trim members,
  a pair of locating members carried by said plate on the same side thereof as said blocks, said locating members each having an outer surface shaped to engage the face of the trim members,
  means for adjusting the position of said locating members relative to said blocks,
  a pair of levers respectively carried by said blocks, and
  a pair of cams respectively carried by said levers, said cams being adapted to engage the rear of the respective trim members and shaped to applying force to the trim members in the direction of said plate and longitudinally of said blocks to clamp the mitered ends of the trim members in close fitting relation.

38. Apparatus according to claim 37 wherein said cams are provided with tooth structure for engaging the rear surface of the trim members.

39. Apparatus according to claim 37 wherein at least one of said blocks is provided with an opening through the edge thereof, said opening being inclined at an angle for guiding a screw into the mitered joint formed between the ends of the trim members.

40. Apparatus according to claim 33 including means on said one elongated member for supporting a second trim member in a predetermined plane parallel to said first-named predetermined plane, and second clamping means carried by said one elongated member for clamping the second trim member in fixed position thereon.

41. Apparatus according to claim 33 wherein both of said elongated members include structure corresponding to a corner of a door jamb.

42. Apparatus according to claim 40 including means carried by said one elongated member for locating one end of a trim member relative thereto.

43. Apparatus for clamping together the adjacent mitered ends of trim members to form a close fitting mitered joint comprising:
  support structure,
  means on said support structure including locating surfaces positioned at a right angle to each other to engage the outer edges of a pair of trim members,
  means on said support structure on the same side thereof as said first-named means including second locating structure having an outer surface shaped to engage the face of the trim members in cooperation with the first-named locating surfaces, and
  means carried by said support structure for applying a force to the back surfaces of the trim members, said force acting in a direction toward said support structure and longitudinally of said locating surfaces to clamp the mitered ends of the trim members in close fitting relation.

44. A retractable clamping assembly for trim or the like comprising:
  means for supporting a trim member with its face exposed and its inner edge engaging a locating surface,
  support structure carried by said first-named means,
  a first lever pivotally carried at one end thereof by said support structure,
  a second lever pivotally carried by said support structure at a location spaced from the pivot of said first lever,
  a surface on said first-named lever adapted to engage the face of the trim member,
  a surface on the second lever adapted to engage the rear edge of the trim member,
  first spring means interconnecting the free ends of said first and second levers, and
  second spring means connected intermediate the ends of said first lever and to said support structure, both of said spring means cooperating to apply forces to said levers to urge said surfaces of said levers against the face and rear edge of the trim member, respectively.

45. A retractable clamping assembly according to claim 44 including first stop structure carried by said support structure and second stop structure carried by said first lever, said first stop structure being engageable by said first lever and said second stop structure being engageable by said second lever when said retractable clamping assembly is in its retracted position with said second spring means being in an over-center position with respect to the pivot of said first lever.

46. A retractable clamping assembly according to claim 44 including a handle carried by said first lever for operating said clamping assembly.

47. A gauge for cutting head jambs for door frames comprising:
  an elongated member having a length greater than the desired length of the head jamb,
  a shoulder carried by one end of said elongated member,
  a slideable member carried at the opposite end of said elongated member,
  means for clamping said slideable member to said elongated member in a predetermined position, and
  locating structure carried by said slideable member on the side thereof adjacent said shoulder, said locating structure and said slideable member having an overall thickness corresponding to twice the desired door clearance in the door frame plus twice the desired depth of dado in the side jambs of the door frame which is to receive the head jamb.

48. A gauge for cutting head jambs for door frames comprising:
- an elongated member having a length greater than the desired length of the head jamb,
- a shoulder carried by one end of said elongated member,
- a slideable member carried at the opposite end of said elongated member,
- locating structure carried by said slideable member on the side thereof adjacent said shoulder,
- means for adjusting the position of said locating structure relative to said slideable member, and
- means for clamping said slideable member to said elongated member in a predetermined position relative to said shoulder.

49. Apparatus according to claim 30 wherein said gauge for determining the position of a head jamb relative to the path of the cutting member comprises:
- an elongated member having a length greater than the desired length of the head jamb and adapted to be engaged by said locating means and by said raised section,
- a shoulder carried by one end of said elongated member and adapted to engage locating structure carried by said raised section adjacent the path of travel of the cutting member,
- a slideable member carried at the opposite end of said elongated member, and
- means for clamping said slideable member to said elongated member in a predetermined position, said slideable member having a thickness corresponding to the spacing between said locating structure and the path of travel of the cutting member.

50. Apparatus according to claim 14 including means for limiting the movement of the cutting member along said guiding means.

51. A gauge for locating trim and stop members having mitered ends comprising:
- a support,
- means on said support for engaging the mitered end of a trim member,
- means on said support for engaging the rear edge of the trim member, and
- means carried by said support for determining the desired setback of the trim member with respect to a jamb.

52. A gauge according to claim 51 including means carried by said support structure for receiving the mitered end of a stop structure, said last-named means being positioned adjacent said means for determining the desired setback of the trim.

53. Apparatus for trimming the frame of a door or window comprising:
- an elongated support having a length at least as great as the desired width of the frame opening,
- a left-hand right angle structure carried at the left end of said elongated support,
- a right-hand right angle structure carried at the right end of said elongated support,
- means for connecting said right angle structures to said elongated support at spaced locations corresponding to the desired frame opening,
- means on each of said right angle structures for clamping side trim members thereto in parallel relation to each other,
- adjustable clamping structure carried by said elongated support, said adjustable clamping structure being adjustable lengthwise of said elongated support to any desired location, and
- structure carried by one of said right angle structures and engageable with said adjustable clamping structure for locating said one of said right angle structures on said elongated structure relative to the other of said right angle structures.

54. Apparatus according to claim 53 including means on each of said right angle structures to gauge the length of the side trim members to be clamped thereto.

55. Apparatus according to claim 53 including a right-hand corner cutting assembly carried by said right-hand right angle structure,
- a left-hand corner cutting assembly carried by said left-hand angle structure, each of said corner cutting assemblies including structure for supporting a head trim member in a plane parallel to the plane of the side trim members with the head trim member being at right angles to said side trim members and the adjacent ends of the head trim member and side trim members overlapping each other, and
- means on each of said corner cutting assemblies for guiding a cutting member along a plane bisecting the respective right angles formed between the ends of the head trim member and the side trim members for concurrently cutting miters on at least one side trim member and the adjacent end of the head trim member.

56. Apparatus according to claim 53 including a miter clamping assembly associated with each of said right angle structures for clamping one mitered end of a side trim member and one end of the head trim member together.

57. Apparatus according to claim 55 including structure for supporting stop members in parallel relation to the side trim members and the head trim member for concurrently cutting miters on the stop members and the trim members.

58. Apparatus for clamping a pair of trim members at a right angle to each other comprising:
- a right angle support assembly including a pair of elongated members joined together at one of their ends to form a right angle structure,
- means on one of said elongated members for supporting a trim member in parallel relation thereto,
- a corner cutting assembly,
- means for connecting asid corner cutting assembly to said support assembly at the junction of said elongated members,
- means on said corner cutting assembly cooperating with said support assembly for supporting the trim members in spaced parallel planes and at a right angle to each other with the adjacent ends of the trim members in overlapping relation,
- means carried by one of said assemblies for clamping at least one of the trim members in fixed position relative to the other of the trim members,
- one of said trim members being located beyond its normal assembled position with respect to the other trim member by a predetermined amount corresponding to the thickness of a cutting member.

59. Apparatus according to claim 58 wherein said corner cutting assembly includes structure for guiding a cutting member along a path bisecting the right angle formed by said pair of elongated members of said support assembly for cutting miters on the trim members.

60. Apparatus according to claim 59 wherein said corner cutting assembly includes means for supporting stop members in parallel relation to said pair of elongated members of said right angle support assembly for cutting miters on the stop members.

61. Corner cutting apparatus comprising:
- a frame,
- means carried by said frame for supporting a pair of trim members in spaced parallel planes and at right angles to each other with adjacent ends of the trim members in overlapping relation,
- means carried by said frame for clamping said trim members in right angle relation to each other,
- means carried by said frame and extending over said overlapping ends of the trim members for guiding a cutting member along a path bisecting the right angle formed between the trim members, and means carried by said frame for supporting stop structure in parallel relation to the trim members for concurerntly cutting a miter on at least one stop member and both of the trim members.

62. Apparatus according to claim 15 including means for locating at least one of the overlapping ends of the trim members relative to the predetermined path of the cutting member.

63. Apparatus according to claim 59 including means including a scale carried by at least one of said elongated members for controlling the longitudinal positioning of one of the trim members therealong relative to the path of the cutting member.

References Cited

UNITED STATES PATENTS

| | | | |
|---|---|---|---|
| 177,605 | 5/1876 | Wieting | 269—87.2 |
| 345,590 | 7/1886 | Hinze | 143—86 |
| 600,370 | 3/1898 | Kohler | 269—37 |
| 748,175 | 12/1903 | Dunne | 143—86 |
| 752,050 | 2/1904 | Dunne | 143—6 |
| 786,539 | 4/1905 | Wales | 144—216 |
| 952,968 | 3/1910 | Walter | 144—288 |
| 1,255,773 | 2/1918 | Morse | 269—231 |
| 2,305,124 | 12/1942 | Wilson | 144—288 |
| 2,908,300 | 11/1959 | Hahn | 143—86 |

WILLIAM W. DYER, Jr., *Primary Examiner.*

R. J. ZLOTNIK, *Assistant Examiner.*